(12) United States Patent
Davidson et al.

(10) Patent No.: US 8,336,040 B2
(45) Date of Patent: Dec. 18, 2012

(54) SYSTEM AND METHOD FOR TOPOLOGY-AWARE JOB SCHEDULING AND BACKFILLING IN AN HPC ENVIRONMENT

(75) Inventors: Shannon V. Davidson, Hillsboro, MO (US); Anthony N. Richoux, Richardson, TX (US)

(73) Assignee: Raytheon Company, Waltham, MA (US)

( * ) Notice: Subject to any disclaimer, the term of this patent is extended or adjusted under 35 U.S.C. 154(b) by 606 days.

(21) Appl. No.: 10/825,021

(22) Filed: Apr. 15, 2004

(65) Prior Publication Data
US 2005/0235286 A1    Oct. 20, 2005

(51) Int. Cl.
*G06F 9/45* (2006.01)
(52) U.S. Cl. ...................................... 717/161
(58) Field of Classification Search ........... 717/159–166
See application file for complete search history.

(56) References Cited

U.S. PATENT DOCUMENTS

| | | | |
|---|---|---|---|
| 4,868,818 A | 9/1989 | Madan | 371/11.3 |
| 4,885,770 A | 12/1989 | Croll | |
| 5,020,059 A | 5/1991 | Gorin et al. | 371/11.3 |
| 5,280,607 A | 1/1994 | Bruck et al. | |
| 5,301,104 A | 4/1994 | Yalamanchili | 395/800 |
| 5,450,578 A | 9/1995 | Mackenthun | 395/182.02 |
| 5,513,313 A | 4/1996 | Bruck et al. | 395/182.02 |
| 5,603,044 A | 2/1997 | Annapareddy et al. | 395/800 |
| 5,682,491 A | 10/1997 | Pechanek et al. | |
| 5,748,872 A | 5/1998 | Norman | 395/182.09 |
| 5,748,882 A | 5/1998 | Huang | 395/184.01 |
| 5,781,715 A | 7/1998 | Sheu | 395/182.02 |
| 5,805,785 A | 9/1998 | Dias et al. | |
| 5,872,928 A | 2/1999 | Lewis et al. | 395/200.52 |
| 5,889,953 A | 3/1999 | Thebaut et al. | 395/200.51 |
| 5,926,619 A | 7/1999 | Badovinatz et al. | 395/182.02 |
| 5,933,631 A | 8/1999 | Mealey et al. | |
| 5,991,877 A | 11/1999 | Luckenbaugh | 713/200 |
| 6,006,242 A | 12/1999 | Poole et al. | 707/531 |
| 6,029,246 A | 2/2000 | Bahr | 713/200 |
| 6,088,330 A | 7/2000 | Bruck et al. | |
| 6,158,010 A | 12/2000 | Moriconi et al. | 713/201 |
| 6,167,502 A | 12/2000 | Pechanek et al. | |
| 6,189,100 B1 | 2/2001 | Barr et al. | 713/182 |
| 6,230,252 B1 | 5/2001 | Passint et al. | 712/12 |
| 6,393,581 B1 | 5/2002 | Friedman et al. | 714/4 |
| 6,408,326 B1 | 6/2002 | Larsson et al. | 709/201 |

(Continued)

FOREIGN PATENT DOCUMENTS

EP        0 981 089 A2    2/2000

(Continued)

OTHER PUBLICATIONS

Hovestadt et al., "Scheduling in HPC Resource Management Systems: Queuing vs. Planning", Proceedings of the 9th Workshop on Job Scheduling Strategies for Parallel Processing, Seattle, WA, pp. 1-19, Jun. 2003.*

(Continued)

*Primary Examiner* — Ted T Vo
(74) *Attorney, Agent, or Firm* — Cantor Colburn LLP

(57) ABSTRACT

A method for job management in an HPC environment includes determining an unallocated subset from a plurality of HPC nodes, with each of the unallocated HPC nodes comprising an integrated fabric. An HPC job is selected from a job queue and executed using at least a portion of the unallocated subset of nodes.

21 Claims, 10 Drawing Sheets

U.S. PATENT DOCUMENTS

| | | |
|---|---|---|
| 6,415,323 B1 | 7/2002 | McCanne et al. ............. 709/225 |
| 6,453,426 B1 | 9/2002 | Gamache et al. ................ 714/4 |
| 6,460,149 B1 | 10/2002 | Rowlands et al. |
| 6,477,663 B1 | 11/2002 | Laranjeira et al. |
| 6,480,927 B1 | 11/2002 | Bauman ........................ 710/317 |
| 6,496,941 B1 | 12/2002 | Segal et al. |
| 6,597,956 B1 | 7/2003 | Aziz et al. |
| 6,629,266 B1 | 9/2003 | Harper et al. .................... 714/38 |
| 6,633,945 B1 | 10/2003 | Fu et al. ......................... 710/316 |
| 6,658,504 B1 | 12/2003 | Lieber et al. ..................... 710/52 |
| 6,675,264 B2 | 1/2004 | Chen et al. ...................... 711/141 |
| 6,683,696 B1 | 1/2004 | Urie et al. |
| 6,691,165 B1 | 2/2004 | Bruck et al. ................... 709/227 |
| 6,718,486 B1 | 4/2004 | Rosellin et al. |
| 6,735,660 B1 | 5/2004 | Osten et al. |
| 6,748,437 B1 | 6/2004 | Mankude et al. ............. 709/227 |
| 6,820,221 B2 | 11/2004 | Fleming |
| 6,853,388 B2 | 2/2005 | Ueno et al. |
| 6,918,051 B2 | 7/2005 | Block et al. |
| 6,918,063 B2 | 7/2005 | Ho et al. |
| 6,922,791 B2 | 7/2005 | Mashayekhi et al. ............. 714/4 |
| 6,950,818 B2 | 9/2005 | Dennis et al. ...................... 707/3 |
| 6,950,833 B2 | 9/2005 | Costello et al. .............. 707/201 |
| 6,952,766 B2 | 10/2005 | Dervin et al. |
| 7,016,299 B2 | 3/2006 | Kashyan |
| 7,028,228 B1 | 4/2006 | Lovy et al. |
| 7,032,119 B2 | 4/2006 | Fung |
| 7,043,539 B1 | 5/2006 | Treiber et al. |
| 7,046,687 B1 | 5/2006 | Brown et al. ................. 370/412 |
| 7,055,148 B2 | 5/2006 | Marsh et al. ................... 717/172 |
| 7,065,764 B1 | 6/2006 | Prael et al. ..................... 718/102 |
| 7,073,053 B1 | 7/2006 | Oz et al. ............................. 713/2 |
| 7,093,004 B2 | 8/2006 | Bernardin et al. |
| 7,107,337 B2 | 9/2006 | Barrow et al. ................. 709/224 |
| 7,127,597 B2 | 10/2006 | Backman et al. |
| 7,155,512 B2 | 12/2006 | Lean et al. ..................... 709/224 |
| 7,207,039 B2 | 4/2007 | Komarla et al. |
| 7,231,430 B2 | 6/2007 | Brownell et al. |
| 7,237,129 B2 | 6/2007 | Fung |
| 7,287,179 B2 | 10/2007 | Doyle et al. ...................... 714/4 |
| 7,299,377 B2 | 11/2007 | Norman .......................... 714/10 |
| 7,379,983 B2 | 5/2008 | Zaharias |
| 7,428,583 B1 | 9/2008 | Lortz et al. .................... 709/223 |
| 7,433,931 B2 | 10/2008 | Richoux ....................... 709/217 |
| 7,644,153 B2 | 1/2010 | Talwar et al. ................. 709/224 |
| 7,685,597 B1 | 3/2010 | Czajkowski et al. ......... 718/100 |
| 2001/0049740 A1 | 12/2001 | Karpoff |
| 2002/0002613 A1 | 1/2002 | Freeman et al. ............. 709/225 |
| 2002/0059427 A1 | 5/2002 | Tamaki et al. ................ 709/226 |
| 2002/0062454 A1 | 5/2002 | Fung ............................. 713/300 |
| 2003/0005039 A1 | 1/2003 | Craddock et al. ............ 709/203 |
| 2003/0005276 A1 | 1/2003 | French et al. ..................... 713/2 |
| 2003/0009551 A1 | 1/2003 | Benfield et al. |
| 2003/0046529 A1 | 3/2003 | Loison et al. ..................... 713/2 |
| 2003/0084100 A1 | 5/2003 | Gahan et al. .................. 709/203 |
| 2003/0097487 A1 | 5/2003 | Rietze et al. .................. 709/325 |
| 2003/0135621 A1 | 7/2003 | Romagnoli |
| 2003/0154112 A1 | 8/2003 | Neiman et al. ..................... 705/5 |
| 2003/0188071 A1 | 10/2003 | Kunjan et al. |
| 2003/0191795 A1 | 10/2003 | Bernardin et al. ............. 709/105 |
| 2003/0217105 A1 | 11/2003 | Zircher et al. |
| 2003/0223361 A1 | 12/2003 | Hussain et al. ................ 370/230 |
| 2003/0237018 A1 | 12/2003 | Baba ............................... 714/4 |
| 2004/0024949 A1 | 2/2004 | Winkler et al. |
| 2004/0034794 A1 | 2/2004 | Mayer et al. .................. 713/200 |
| 2004/0054780 A1 | 3/2004 | Romero ........................ 709/226 |
| 2004/0103218 A1 | 5/2004 | Blumrich et al. |
| 2004/0186920 A1 | 9/2004 | Birdwell et al. ................... 710/1 |
| 2004/0210656 A1 | 10/2004 | Beck et al. .................... 709/225 |
| 2004/0268000 A1 | 12/2004 | Barker et al. |
| 2005/0015384 A1 | 1/2005 | Wehrman et al. ............. 707/100 |
| 2005/0071843 A1 | 3/2005 | Guo et al. ..................... 718/101 |
| 2005/0149924 A1 | 7/2005 | Komarla et al. .............. 717/176 |
| 2005/0198200 A1 | 9/2005 | Subramanian et al. ....... 709/218 |
| 2005/0234846 A1 | 10/2005 | Davidson et al. |
| 2005/0235055 A1 | 10/2005 | Davidson |
| 2005/0235092 A1 | 10/2005 | Ballew et al. |
| 2005/0235286 A1 | 10/2005 | Ballew et al. |
| 2005/0246569 A1 | 11/2005 | Ballew et al. ..................... 714/4 |
| 2005/0251567 A1 | 11/2005 | Ballew et al. |
| 2005/0256942 A1 | 11/2005 | McCardle et al. ............ 709/220 |
| 2006/0106931 A1 | 5/2006 | Richoux |
| 2006/0112297 A1 | 5/2006 | Davidson |
| 2006/0117208 A1 | 6/2006 | Davidson |
| 2006/0195508 A1 | 8/2006 | Bernardin et al. ............. 709/203 |
| 2007/0067435 A1 | 3/2007 | Landis et al. ................. 709/224 |
| 2009/0031316 A1 | 1/2009 | Richoux ....................... 718/102 |

FOREIGN PATENT DOCUMENTS

| | | |
|---|---|---|
| JP | 05-274178 | 10/1993 |
| JP | 7200496 | 8/1995 |
| JP | 8-227356 | 9/1996 |
| JP | 10-116261 | 6/1998 |
| JP | 10-222475 | 8/1998 |
| JP | 2002-024192 | 1/2002 |
| JP | 2002-108839 | 4/2002 |
| JP | 2003-009412 | 4/2003 |
| JP | 2004-110791 | 4/2004 |
| JP | 2007141305 | 6/2007 |
| KR | 2001-0000624 | 1/2001 |
| WO | WO 02/084509 | 10/2002 |
| WO | WO 02/095580 A1 | 11/2002 |
| WO | WO 03/005192 | 1/2003 |
| WO | WO 2005/106696 A1 | 11/2005 |

OTHER PUBLICATIONS

Keller et al., "Anatomy of a Resource Management System for HPC Clusters", Annual Review of Scalable Computing, vol. 3., pp. 1-23, 2001.*

Cisco Systems, "Cisco 12012 Gigabit Switch Router Switch Fabric Cards Replacement Instructions", 2002, Doc. No. 78-4343-02, Cisco Systems, Inc., pp. 1-14.*

SearchStorage.com, "Look up Tech Terms—Switching fabric", retrieved on Oct. 6, 2009, http://search.techtarget.com, pp. 1-4.*

Jonsson et al., "Comparative Performance of InfiniBand Architecture and Gigabit Ethernet Interconnects on Intel® Itanium® 2 Microarchitecture-based Clusters", May 2003, 4th European LS-DYNA Users Conference, 10 pages.*

Patent Application entitled, "*High Performance Computing System and Method*", 47 pages specification, claims and abstract, 10 pages of drawings, inventors Ballew et al, Apr. 15, 2004.

Patent Application entitled, "*System and Method for Cluster Management Based on HPC Architecture*", 49 pages specification, claims and abstract, 10 pages of drawings, inventors Ballew et al, Apr. 15, 2004.

Patent Application entitled, "*System and Method for Detecting and Managing HPC Node Failure*", 49 pages specification, claims and abstract, 10 pages of drawings, inventors Ballew et al, Apr. 15, 2004.

Patent Application entitled, "*Graphical User Interface for Managing HPC Clusters*", 48 pages specification, claims and abstract, 10 pages of drawings, inventors Ballew et al, Apr. 15, 2004.

Communication from the European Patent Office, European Search Report for Application No. EP 05 25 2235, 3 pages, Jul. 22, 2005.

Rzymianowicz et al., "Clustering SMP Nodes with the ATOLL Network: A Look into the Future of System Area Networks," Proceedings of High Performance Computing, 8th International Conference, May 8, 2000, 10 pages.

Bhanot et al., "The BlueGene/L Supercomputer," 20th International Symposium on Lattice Field Theory, vol. 119, Jun. 2002, 8 pages.

Advanced Micro Devices et al., "Hypertransport Technology I/O Link—A High-Bandwidth I/O Architecture," Jul. 20, 2001, pp. 1-25.

Pinkston et al., "InfiniBand: The "De Facto" Future Standard for System and Local Area Networks or Just a Scalable Replacement for PCI Buses?," Cluster Computing-Kluwer Academic Publishers, vol. 6, No. 2, 2003.

Culler et al., "Parallel Computer Architecture—A Hardware/Software Approach, Interconnection Network Design," Morgan Kaufmann, 1999, 30 pages.

Communication from the European Patent Office, European Search Report for Application No. PCT/US2005/012031, 6 pages, Aug. 1, 2005 and Written Opinion of the International Search Authority, 5 pages.

Chang et al., "Performance Improvement of Allocation Schemes for Mesh-Connected Computers," Journal of Parallel and Distributed Computing, Academic Press, Duluth, MN, vol. 52, No. 1, Jul. 10, 1998, 30 pages.

Wanqian, et al. "Non-Contiguous Processor Allocation Algorithms for Distributed Memory Multicomputers," Supercomputing '94, Proceedings, Washington, D.C., Nov. 14-18, 1994, 10 pages.

Krevat et al., "Job Scheduling for the BlueGene/L System," Lecture Notes in Computer Science, vol. 2537, Jul. 24, 2002, 18 pages.

Communication from the European Patent Office, European Search Report for Application No. PCT/US2005/012313, 7 pages, Sep. 20, 2005, and Written Opinion of the International Search Authority, 7 pages.

Communication from the European Patent Office, European Search Report for Application No. PCT/US2005/012316, 7 pages, Sep. 14, 2005, and Written Opinion of the International Search Authority, 7 pages.

Communication from the European Patent Office, European Search Report for Application No. PCT/US2005/012242, 7 pages, Sep. 19, 2005, and Written Opinion of the International Search Authority, 9 pages.

Davidson, U.S. Appl. No. 10/991,754, filed Nov. 17, 2004, entitled Fault Tolerance and Recovery in a High-Performance Computing (HPC) System, 117 pages.

Communication from the European Patent Office, European Search Report for Application No. PCT/US2005/012314, 6 pages, Sep. 20, 2005, and Written Opinion of the International Search Authority, 7 pages.

Feitelson, "Job Scheduling in Multiprogrammed Parallel Systems", IBM Research Report, Aug. 1997, pp. 1-4, XP002942107.

Kandlur et al., "Hypercube Management in the Presence of Node Failures", third conference on hypercube concurrent computers and applications ACM New York, 1988, pp. 328-336, vol. 1, XP002364194.

Wenjian et al., "Efficient Processor Allocation for 3D Tori", Parallel Processing Symposium 1995, Proceedings, 9th International, Apr. 25-28, 1995, IEEE Comput. Soc., pp. 466-471, XP010135921.

Ma et al., E-Kernel: An Embedding Kernel on the IBM Victor V256, Multiprocessor for Program Mapping and Network Reconfiguration, IEEE Transactions on Parallel and Distributed Systems, IEEE Service Center, vol. 5, No. 9, Sep. 1, 1994, pp. 977-994, XP000460490.

Communication from the European Patent Office, European Search Report for Application No. PCT/US2005/012643, 6 pages, Apr. 19, 2006, and Written Opinion of the International Search Authority, 5 pages.

Haynes et al., "A Visualization Tool for Analyzing Cluster Performance Data," 42nd Annual Symposium on Foundations of Computer Science, (FOCS 2001), Oct. 8, 2001, pp. 295-302.

Patel et al., "Sage: An Application Development Tool Suite for High Performance Computing Systems," Aerospace Conference Proceedings, 2000, IEEE, vol. 11, pp. 491-500.

Baraglia et al, "RsdEditor: A Graphical User Interface for Specifying Metacomputer Components," Heterogeneous Computing Workshop Proceedings, 9th Cancun, Mexico, pp. 336-345, May 1, 2000.

Wong, William, "Switch-Chip Fuels Third-Generation InfiniBand," Nov. 10, 2003, Electronic Design, 2 pages.

Communication from the European Patent Office, European Search Report for Application No. PCT/US2005/012500 and Written Opinion of the International Search Authority, mailed Aug. 1, 2005, 12 pages.

Communication from the European Patent Office, European Search Report for Application No. PCT/US2005/012489 and Written Opinion of the International Search Authority, mailed Nov. 18, 2005, 14 pages.

Unknown, "Message Passing Interface (MPI)," Internet Article, Online!, Dec. 23, 2003, pp. 1-33, retrieved from the internet: URL:http//web.archive.org/web/20040102194825/http://www.llnl.gov/computing/tutorial s/mpi/>, retrieved on Jul. 18, 2005.

Panagiotis, Christias et al., "inetd—Internet Services Daemon," pp. 1-4, 1994 Man-cgi 1.15S, 1995 Modified for Solaris 2.3.

Di Santo et al., "Kernel Implementation of Locality-Aware Dispatching Techniques for Web Server Clusters," Cluster Computing, 2003 Proceedings, pp. 154-162.

Davidson et al., U.S. Appl. No. 10/825,345, entitled, *System and Method for Computer Cluster Virtualization Using Dynamic Boot Images and Virtual Disk*, 47 pages of specification, 10 pages of drawings, Apr. 15, 2004.

Davidson, U.S. Appl. No. 10/991,598, entitled, "*Scheduling in a High Performance Computing (HPC) System*", 111 pages specification, claims and abstract, 11 pages of drawings, Nov. 17, 2004.

Davidson, U.S. Appl. No. 10/991,994, entitled, "*On-Demand Instantiation in a High-Performance Computing (HPC) System*", 110 pages specification, claims and abstract, 12 pages of drawings, Nov. 17, 2004.

The Intellectual Property Bureau Ministry of Economic Affairs, Office Action for Application No. 94111492, 2 pages.

Jiun-Sheng et al., "Network Topology Structure on Board of Computer Cluster," Publication No. TW532011B, Data Supplied from the esp@cenet database—Worldwide, 1 page.

Hans-Ulrich Heiss, "Processor Management in Two-Dimensional Grid-Architectures," Interner Bericht Nr. 20/92, XP002416087, 51 pages.

EPO Registered Letter, Application No. 05 252 239.8-1243, 6 pages, Mailed Feb. 2, 2007.

The Patent Office of the State Intellectual Property Office of the People's Republic of China, Office Action for Application No. 200510081719.3, 11 pages, Apr. 20, 2007.

Falck et al., Swedish Patent No. 102405, Application No. 102405, Aug. 26, 1941, 4 pages.

Nikkei Solution Business, "Most Up-to-Date Storage Solutions, Powerful for Substantial Cost Reduction in IT Systems," pp. 105-110, Sep. 2003.

Anonymous, "HP AlphaServer SC User Guide," Internet Article, Online!, Jul. 12, 2004, pp. 1-38, XP002336777, Retrieved from the Internet: URL:http://web1.quadrics.com/onlinedocs/AlphaServer/Eagle/html/AlphaServerUserGuide/, retrieved on Jul. 19, 2005, p. 3, p. 7, pp. 31, 33, and 34.

Hyunseung Choo et al., "An Efficient Submesh Allocation Scheme for 3D Torus Multicomputer Systems," Parallel Algorithms/Architecture Synthesis, 1997 Proceedings, Second AIZU International Symposium AIZU-WAKAMATSU, Japan, Mar. 17-21, 1997, Los Alamitos, CA, Mar. 17, 1997, pp. 83-90, XP010218817 ISBN: 0-8186-7870-4, abstract, (p. 83, right-hand column, lines 2-20), (p. 87, left-hand column, lines 42-49).

Anonymous, "Cisco LocalDirector Configuration and Command Reference Guide," Internet Article, Online!, Apr. 4, 2001, pp. 1-12, XP002352335, Retrieved from the Internet: URL:http://www.k-state.edu/cns/project/KEAS/Cisco%20Hardware/Local_Director.htm, retrieved on Nov. 1, 2005, p. 1.1, p. 1.4, p. 3.9, p. 3.12.

Moore J. et al., "Managing Mixed-Use Clusters with Cluster-on-Demand," Internet Article, Nov. 2002, XP002311138, (p. 1, right-hand column, lines 10-41), (p. 2, right-hand column, lines 17-41), (p. 4, right-hand column, line 22), (p. 5, left-hand column, line 3).

Ross et al., "Connectionless Transport: UDP," Internet Article, Online!, Feb. 22, 2001, pp. 1-4, XP002352336, Retrieved from the Internet: URL:http://web.archive.org/web/200100222023253/http://www-net.cs.umass.edu/kirose/transport/UDP.html., Feb. 22, 2001.

Translated Japanese Patent Application No. 2003-531412, 4 pages, printed Jan. 4, 2008.

Translation of an Office Action, Japanese Patent Application No. 2005-117406, 6 pages.

Translation of an Office Action, Japanese Patent Application No. 2005-117403, 4 pages.

Translation of an Office Action, Japanese Patent Application No. 2005-117404, 7 pages.

Kimitalca et al., "Liquid Crystal Display Device," Abstracts of Japan for Publication No. 2005-241804, published Sep. 8, 2005, 2 pages.

Hidenori et al., "Magnetic Disk Drive," Abstracts of Japan for Publication No. 2007-141305, published Jun. 7, 2007, 2 pages.

Koichiro, "Semiconductor Storage Device and Its Test Method," Abstracts of Japan for Publication No. 2007-200496, published Aug. 9, 2007, 2 pages.

Translated Office Action for Korean Patent Application No. 10-2006-7023880, 8 pages.

Allen et al., "Title: The Cactus Worm: Experiments with Dynamic Resource Discovery and Allocation in a Grid Environment," 16 pages, Jan. 8, 2001.
Translated Office Action for Korean Patent Application No. 94111492, 6 pages.
Choo et al., "Processor Scheduling and Allocation for 3D Torus Multicomputer Systems", IEEE Transactions on Parallel and Distributed Systems, vol. 11, No. 5, May 2000, pp. 475-484.
Canadian Intellectual Property Office; Office Action for Application No. 2,503,775; 5 pages, Jan. 8, 2009.
Canadian Intellectual Property Office; Office Action for Application No. 2,503,781; 4 pages, Jan. 8, 2009.
English Translation of the Korean Notice of Final Rejection for Application No. 10-2006-7023880; 5 pages, Feb. 25, 2009.
Perbadanan Harta Intelek Malaysia; Office Action for Application No. PI 20051523; 3 pages, Mar. 6, 2009.
Intellectual Property Office of Singapore; Examination Report for International Application No. 200607088-2; 7 pages, Apr. 13, 2009.
Korean International Patent Office; Notice of Last Preliminary Rejection for Application No. 10-2006-7023880; 5 pages, May 28, 2009.
Korean International Patent Office; Notice of Last Preliminary Rejection English Translation for Application No. 10-2006-07023880; 4 pages, May 28, 2009.
Canadian Intellectual Property Office; Office Action for Application No. 2,503,773; 3 pages, Jun. 4, 2009.
Japanese Patent Office; Translation of an Office Action for Application No. 2005-117403; 1 page, Jun. 26, 2009.
Japanese Patent Office; Translation of an Office Action for Application No. 2005-117404; 1 page, Jun. 26, 2009.
Japanese Patent Office; Translation of an Office Action for Application No. 2005-117406; 1 page, Jun. 26, 2009.
European Patent Office; Communication Pursuant to Article 94(3) EPC for Application No. 05 732 940.1-2211, Ref. JL36196P.EPP, 4 pages, Jan. 15, 2010.
The Patent Office of the State Intellectual Property Office of the People's Republic of China; Decision on Rejection for Application No. 200510087855.3; 7 pages, Jun. 26, 2009.
Translation of an Office Action of Japanese Patent Office for Application No. 2007-508457; 3 pages, Aug. 12, 2009.
European Patent Office; Communication Pursuant to Article 94(3) EPC for Application No. 05 252 234.9-2211; 3 pages, Aug. 14, 2009.
European Patent Office; Communication Pursuant to Article 94(3) EPC for Application No. 07007897.7-2211 / 1814029; 1 page, Sep. 18, 2009.
European Patent Office; Communicatin Pursuant to Article 94(3) EPC for Application No. 05 737 440.7-1244, Ref. JL36200P.EPP, 4 pages, Nov. 12, 2009.
Official Letter re: R.O.C. (Taiwanese) Application No. 94111492, notifying of contents of forthcoming second (final) Office Action and indicating opportunity to respond, and Search Report of the EP corresponding application (EP 1566738 A3); 7 pages, Saint Island Int'l letter dated May 13, 2010.
European Patent Office Communication re: Summons to Attend Oral Proceedings Pursuant to Rule 115(1) EPC for Application No. 05 252 239.8-1243 / 1580661, Ref. JL5105, (6 pgs), Jul. 27, 2010.
Malaysia Patent Office Communication re: Substantive Examination Adverse Report (Section 30(1)/30(2)) for Application No. PI 20051525, Filing Date Apr. 5, 2005, Ref. 7945MY4/PM/MS/WN (2 pgs), Mailed: Aug. 30, 2010.
Japanese Patent Office Communication, Japanese Office Action and Translation of an Office Action for Application No. 2007-508456, dated Aug. 4, 2010, (6 pg), Mailed: Aug. 10, 2010.
Japanese Patent Office Communication, Japanese OA and English Translation for Appl No. 2005-117404, Appeal No. 2009-14314, drafted Nov. 30, 2010, (6 pgs), Mailed: Dec. 7, 2010.
USPTO Office Action for U.S. Appl. No. 10/825,345, filed Apr. 15, 2004 Inventor Shannon V. Davidson.; (18 pgs), Notification Date Oct. 28, 2010.
Israel Patent Office Communication Re: Brief Translation of the Office Action, Re: Notice of Deficiencies in Patent No. 178607 (4 pgs), Mailed: Sep. 13, 2010.
Israel Patent Office Communication Re: Brief Translation of the Office Action, Re: Notice of Deficiencies in Patent No. 178608 (4 pgs), Mailed: Sep. 20, 2010.
Israel Patent Office Communication Re: Brief Translation of the Office Action, Re: Notice of Deficiencies in Patent No. 178610 (4 pgs), Mailed Sep. 20, 2010.
Israel Patent Office Communication Re: Hebrew version and brief English Translation of Office Action, ref: Patent appl. No. 179827 (3 pgs), Mailed: Oct. 10, 2010.
Japanese Patent Office Communication, Japanese Office Action and Translation of an Office Action for Application No. 2007-508457, JBBL/P0631, dated Sep. 29, 2010, Mailed: Oct. 12, 2010.
European Patent Office Communication Re: Decision to Refuse a European Patent Application, No. 05 252 239.8-1243, at the oral proceedings dated Mar. 11, 2010, Ref. JL 5105, and minutes in accordance with Rule 124(4) EPC (63 pgs), Mailed: Dec. 2, 2010.
Israel Patent Office Communication Re: Hebrew version and brief English Translation of Office Action, ref: Patent appl. No. 178606 (3 pgs) Mailed: Sep. 19, 2010.
Perbadanan Harat Intelek Malaysia; Malaysia Patent Office Communication re: Substantive Examination Adverse Report (Section 30(1)/30(2)) for Appl. No. PI 20051526, filing date Apr. 5, 2005, Ref. 7945MY2/PM/MS/AR (3 pgs), Mailed Jan. 31, 2011.
USPTO Office Action for U.S. Appl. No. 10/991,994, filed Nov. 17, 2004, Inventor Shannon V. Davidson; (14 pgs), Notification Date Jan. 19, 2011.
European Patent Office Communication Re: Summons to attend oral proceedings pursuant to Rule 115(1) EPC; Appl. No. 05 732 940.1-2211, dated Jan. 27, 2011/1735714, Ref. JL 36196P.EPP (7 pgs).
European Patent Office Communication Pursuant to Article 94(3) EPC for Application 07 007 897.7-2211, Ref. JL30003P. EPPD1; 7 pgs, Dated Feb. 22, 2011.
USPTO Final Office Action for U.S. Appl. No. 10/825,539, filed Apr. 15, 2004 Inventor James D. Ballew et al.; (22 pgs), Notification Date Mar. 17, 2011.
USPTO Final Office Action for U.S. Appl. No. 10/825,345, filed Apr. 15, 2004 Inventor Shannon V. Davidson.; (22 pgs), Notification Date Apr. 15, 2011.
USPTO; Notice of Allowance and Fee(s) Due for U.S. Appl. No. 10/824, filed Apr. 15, 2004, Inventor James D. Ballew; (5 pgs), Mailed May 5, 2011.
USPTO; non final Office Action, U.S. Appl. No. 12/246,783, filed Oct. 7, 2008, Inventor Anthony N. Richoux; (26 pgs), Notification Date May 11, 2011.
Korean Patent Office Communication (KIPO) Ofice Action and English Translation re: Notice of Preliminary Rejection, Examination Results Summary,—Notification of Reason for Refusal; Application No. 10-2006-7023881, dated Apr. 26, 2011, (7 pgs).
Canadian Intellectual Property Office; Office Action for Application No. 2,503,781; file No. 59261; (2 pgs), Jun. 6, 2011.
European Patent Office, Munich Germany, Communication re: Summons to attend oral proceedings pursuant to Rule 115(1) EPC, for Application No. 05 742 298.2-2224, Ref. JL 36198P.EPP, (7 pgs), Mailed: May 13, 2011.
Cukier, M. et al.; "AQuA: an adaptive architecture that provides dependable distributed objects"; 1998 Reliable Distributed Systems. Proceedings. Seventeenth IEEE Symposium on West Lafayette, USA Oct. 20, 1998, pp. 245-253, XP010319083, DOI: DOI:10.1109/RELDIS. 1998.740506 ISBN: 978-0-8186-9218, 1998.
European Patent Office Communication, Netherlands Communication re: Summons to attend oral proceedings in accordance to Rule 115(1) EPC, for Application No. 05 737 440.7-1244 / 1735949, (7 pgs), Aug. 4, 2011.
European Patent Office Communication, Munich Germany Communication re: Minutes of oral proceedings in accordance to Rule 124(4) EPC, for Application No. 05 732 940.1-2211, Ref. JL36196P.EPP, (14 pgs), Jul. 13, 2011.
Korean Patent Office Communication, OA and English Translation re: Notice of Preliminary Rejection; KIPO Examination Results Summary, Ref: Detailed Grounds for Rejection for Appl. No. 10-2007-7013503, (6 pgs), Jul. 18, 2011.

*Korean Patent Office Communication*, Korean OA and Translation for Appl. No. 10-2006-7021323, dated Jul. 14, 2011, KIPO Examination Results Summary Ref: Detailed Grounds for Rejection (8 pgs).

*Japanese Patent Office Communication*, Japanese OA and English Translation for Appl No. 2007-508520, Ref.: JBBL/P0632, dated Jun. 17, 2011; (6 pgs), Jun. 28, 2011.

Masashi Shiraishi et al.; *Parallel Job Execution Tool: ParaJET*; Institute of Electronics, Information and Communication Engineers, Technical Report of IEICE, CPSY95-60 (Aug. 1996), Mitsubishi Electric Corp., IT R&D Center; (9 pgs), 1997.

*USPTO; Office Action* for U.S. Appl. No. 10/991,994, filed Nov. 17, 2004 Inventor Shannon V. Davidson; (15 pgs), Aug. 19, 2011.

*USPTO; Notice of Allowance and Fee(s) Due* for U.S. Appl. No. 10/824,874, filed Apr. 15, 2004, in the name of James D. Ballew; (7 pgs.), Aug. 22, 2011.

*European Patent Office*, Netherlands, Communication pursuant to Article 94(3) EPC Office Action for Application No. 05 252 237.2-1243 / JL5127 (6 pgs), Aug. 2, 2011.

*Canadian Intellectual Property Office; Office Action* for Application No. 2,503,773; file No. 59259; (2 pgs), Aug. 9, 2011.

*Japanese Patent Office Communication*, Japanese Office Action and Translation of Office Action for Application No. 2007-508456, dated Jul. 26, 2011, (11 pgs), Mailed: Aug. 2, 2011.

*Japanese Patent Office Communication*, Japanese Office Action and Translation of Office Action for Application No. 2005-117404, dated Aug. 26, 2011, (41 pgs), Mailed: Aug. 30, 2011.

*Korean Patent Office Communication*, OA and English Translation, Examination Results Summary re: KIPO's Notice of Preliminary Rejection (English Translation) for Application 10-2006-7023882, (4 pgs.), Jul. 18, 2011.

*European Patent Office Communication*, Netherlands Communication re: Summons to attend oral proceedings in accordance to Rule 115(1) EPC, for Application No. 05 252 240.6-1243 / 1662388, (8 pgs), Aug. 5, 2011.

*European Patent Office*-Munich, Germany Communication re: Examining Div., oral proceedings of Sep. 22, 2011, Decision to refuse EU patent appl., Appl. 05 742 298.2-2224 / 1735708, Ref. JL36198P.EPP; Nov. 2, 2011 (Feb. 11, 2011).

*USPTO; Notice of Allowance*, U.S. Appl. No. 10/825,345, filed Apr. 15, 2004 in the name of Shannon V. Davidson; Notification Date Oct. 27, 2011.

*USPTO; Notice of Allowance*, U.S. Appl. No. 12/246,783, filed Oct. 7, 2008 in the name of Anthony N. Richoux; Notification Date Sep. 29, 2011.

*USPTO; Office Action* for U.S. Appl. No. 10/824,873, filed Apr. 15, 2004 in the name of Shannon V. Davidson; 14 pgs, Notification Date Nov. 18, 2011.

John P. Hayes, et al.; *Hypercube Supercomputers*; Proceedings of the IEEE; vol. 77, No. 12; XP-009113537; pp. 1829-1841, Dec. 1989.

Kurt Windisch, et al.; *ProcSimity: An Experimental Tool for Processor Allocation and Scheduling in Highly Parallel Systems*; XP-10130254; pp. 414-421, 1995.

Hee Yong Youn, et al.; *Dynamic Task Scheduling and Allocation for 3D Torus Multicomputer Systems*; 1996 International Conference on Parallel Processing; XP-9113574; pp. III-199-III-206, 1996.

Hsing-Lung Chen, et al.; *Distributed Submesh Determination in Faulty Tori and Meshes*; XP-10216762; pp. 65-70, 1997.

Geunmo Kim, et al.; *On Submesh Allocation for Mesh Multicomputers: A Best-Fit Allocation and a Virtual Submesh Allocation for Faulty Meshes*; IEEE Transactions on Parallel and Distributed Systems; vol. 9, No. 2; XP-000736328; pp. 175-185, Feb. 1998.

Moonsoo Kang, et al.; *Job-Based Queue Delay Modeling in a Space-Shared Hypercube*; XP-10356056; pp. 313-318, 1999.

*USPTO; Advisory Action* for U.S. Appl. No. 10/825,539, filed Apr. 15, 2004 in the name of James D. Ballew; 3 pages, Mar. 11, 2009.

*European Patent Office Communication* for Application No. 07007897.7-2211; 12 pages, Mar. 19, 2009.

*USPTO; Office Action* for U.S. Appl. No. 10/991,994, filed Nov. 17, 2004 in the name of Shannon V. Davidson; 14 pages, Mar. 26, 2009.

\* cited by examiner

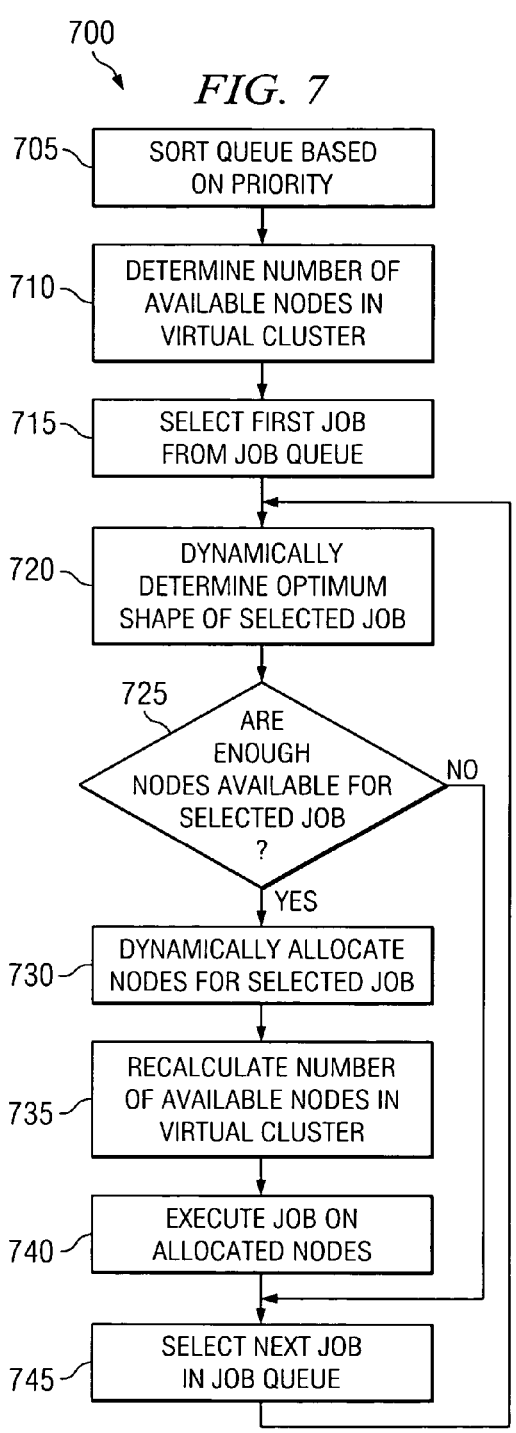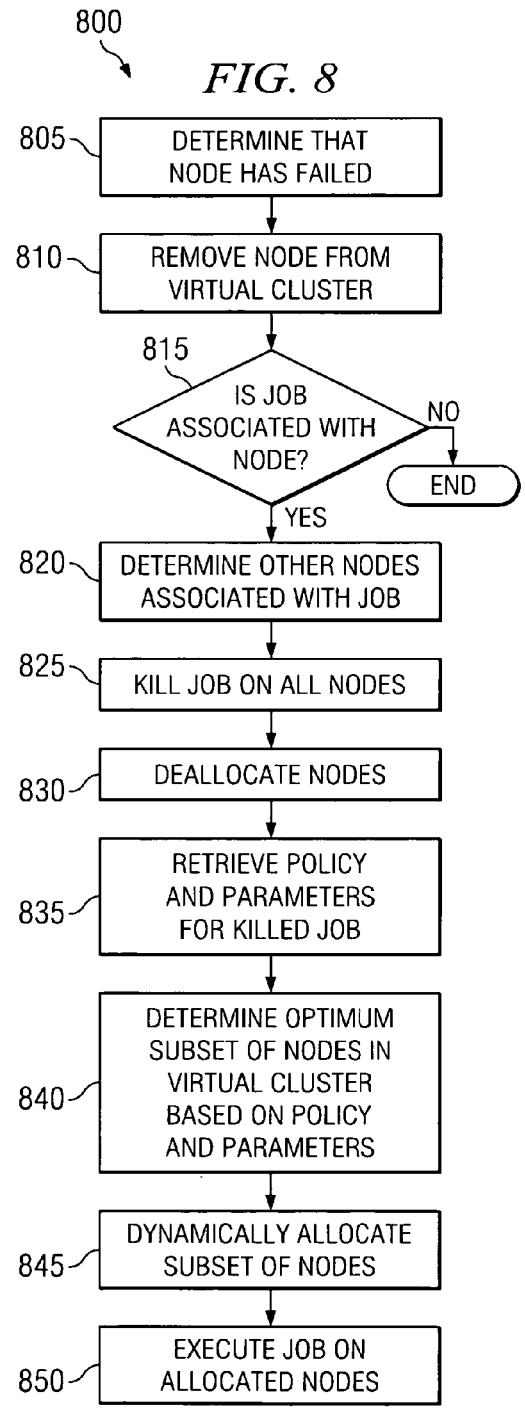

US 8,336,040 B2

SYSTEM AND METHOD FOR TOPOLOGY-AWARE JOB SCHEDULING AND BACKFILLING IN AN HPC ENVIRONMENT

TECHNICAL FIELD

This disclosure relates generally to the field of data processing and, more specifically, to a system and method for topology-aware job scheduling and backfilling

BACKGROUND OF THE INVENTION

High Performance Computing (HPC) is often characterized by the computing systems used by scientists and engineers for modeling, simulating, and analyzing complex physical or algorithmic phenomena. Currently, HPC machines are typically designed using numerous HPC clusters of one or more processors referred to as nodes. For most large scientific and engineering applications, performance is chiefly determined by parallel scalability and not the speed of individual nodes; therefore, scalability is often a limiting factor in building or purchasing such high performance clusters. Scalability is generally considered to be based on i) hardware, ii) memory, I/O, and communication bandwidth; iii) software; iv) architecture; and v) applications. The processing, memory, and I/O bandwidth in most conventional HPC environments are normally not well balanced and, therefore, do not scale well. Many HPC environments do not have the I/O bandwidth to satisfy high-end data processing requirements or are built with blades that have too many unneeded components installed, which tend to dramatically reduce the system's reliability. Accordingly, many HPC environments may not provide robust cluster management software for efficient operation in production-oriented environments.

SUMMARY OF THE INVENTION

This disclosure provides a system and method for job management in an HPC environment that includes determining an unallocated subset from a plurality of HPC nodes, with each of the unallocated HPC nodes comprising an integrated fabric. An HPC job is selected from a job queue and executed using at least a portion of the unallocated subset of nodes.

The invention has several important technical advantages. For example, one possible advantage of the present invention is that by at least partially reducing, distributing, or eliminating centralized switching functionality, it may provide greater input/output (I/O) performance, perhaps four to eight times the conventional HPC bandwidth. Indeed, in certain embodiments, the I/O performance may nearly equal processor performance. This well-balanced approach may be less sensitive to communications overhead. Accordingly, the present invention may increase blade and overall system performance. A further possible advantage is reduced interconnect latency. Further, the present invention may be more easily scaleable, reliable, and fault tolerant than conventional blades. Yet another advantage may be a reduction of the costs involved in manufacturing an HPC server, which may be passed on to universities and engineering labs, and/or the costs involved in performing HPC processing. The invention may further allow for management software that is more robust and efficient based, at least in part, on the balanced architecture. Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 7 is a flowchart illustrating a method for dynamic backfilling of the grid in accordance with the high-performance computing system of FIG. 1; and FIG. 8 is a flow chart illustrating a method for dynamically managing a node failure in accordance with the high-performance computing system of FIG. 1.

DETAILED DESCRIPTION OF THE DRAWINGS

Figure 1:
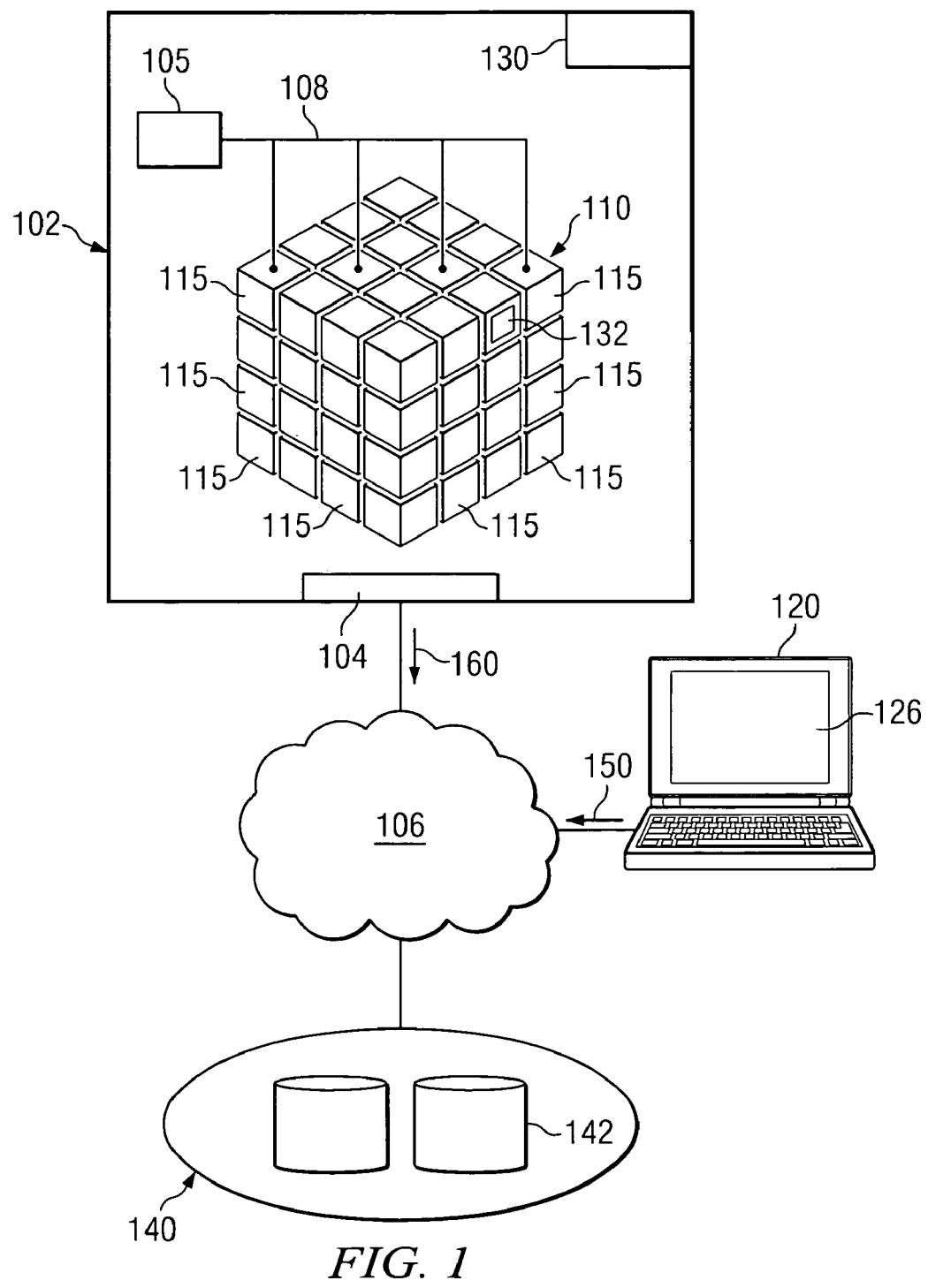
FIG. 1 illustrates an example high-performance computing system in accordance with one embodiment of the present disclosure.

FIG. 1 is a block diagram illustrating a high Performance Computing (HPC) system 100 for executing software applications and processes, for example an atmospheric, weather, or crash simulation, using HPC techniques. System 100 provides users with HPC functionality dynamically allocated among various computing nodes 115 with I/O performance substantially similar to the processing performance. Generally, these nodes 115 are easily scaleable because of, among other things, this increased input/output (I/O) performance and reduced fabric latency. For example, the scalability of nodes 115 in a distributed architecture may be represented by a derivative of Amdahl's law:

$$S(N)=1/((FP/N)+FS)*(1-Fc*(1-RR/L))$$

where S(N)=Speedup on N processors, Fp=Fraction of Parallel Code, Fs=Fraction of Non-Parallel Code, Fc=Fraction of processing devoted to communications, and RR/L=Ratio of Remote/Local Memory Bandwidth. Therefore, by HPC system 100 providing I/O performance substantially equal to or nearing processing performance, HPC system 100 increases overall efficiency of HPC applications and allows for easier system administration.

HPC system 100 is a distributed client/server system that allows users (such as scientists and engineers) to submit jobs 150 for processing on an HPC server 102. For example, system 100 may include HPC server 102 that is connected, through network 106, to one or more administration workstations or local clients 120. But system 100 may be a standalone computing environment or any other suitable environment. In short, system 100 is any HPC computing environment that includes highly scaleable nodes 115 and allows the user to submit jobs 150, dynamically allocates scaleable nodes 115 for job 150, and automatically executes job 150 using the allocated nodes 115. Job 150 may be any batch or online job operable to be processed using HPC techniques and submitted by any apt user. For example, job 150 may be a request for a simulation, a model, or for any other high-performance requirement. Job 150 may also be a request to run a data center application, such as a clustered database, an online transaction processing system, or a clustered application server. The term "dynamically," as used herein, generally means that certain processing is determined, at least in part, at run-time based on one or more variables. The term "automatically," as used herein, generally means that the appropriate processing is substantially performed by at least part of HPC system 100. It should be understood that "automatically" further contemplates any suitable user or administrator interaction with system 100 without departing from the scope of this disclosure.

HPC server 102 comprises any local or remote computer operable to process job 150 using a plurality of balanced nodes 115 and cluster management engine 130. Generally, HPC server 102 comprises a distributed computer such as a blade server or other distributed server. However the configuration, server 102 includes a plurality of nodes 115. Nodes 115 comprise any computer or processing device such as, for example, blades, general-purpose personal computers (PC), Macintoshes, workstations, Unix-based computers, or any other suitable devices. Generally, FIG. 1 provides merely one example of computers that may be used with the disclosure. For example, although FIG. 1 illustrates one server 102 that may be used with the disclosure, system 100 can be implemented using computers other than servers, as well as a server pool. In other words, the present disclosure contemplates computers other than general purpose computers as well as computers without conventional operating systems. As used in this document, the term "computer" is intended to encompass a personal computer, workstation, network computer, or any other suitable processing device. HPC server 102, or the component nodes 115, may be adapted to execute any operating system including Linux, UNIX, Windows Server, or any other suitable operating system. According to one embodiment, HPC server 102 may also include or be communicably coupled with a remote web server. Therefore, server 102 may comprise any computer with software and/or hardware in any combination suitable to dynamically allocate nodes 115 to process HPC job 150.

At a high level, HPC server 102 includes a management node 105, a grid 110 comprising a plurality of nodes 115, and cluster management engine 130. More specifically, server 102 may be a standard 19" rack including a plurality of blades (nodes 115) with some or all of the following components: i) dual-processors; ii) large, high bandwidth memory; iii) dual host channel adapters (HCAs); iv) integrated fabric switching; v) FPGA support; and vi) redundant power inputs or N+1 power supplies. These various components allow for failures to be confined to the node level. But it will be understood that HPC server 102 and nodes 115 may not include all of these components.

Management node 105 comprises at least one blade substantially dedicated to managing or assisting an administrator. For example, management node 105 may comprise two blades, with one of the two blades being redundant (such as an active/passive configuration). In one embodiment, management node 105 may be the same type of blade or computing device as HPC nodes 115. But, management node 105 may be any node, including any number of circuits and configured in any suitable fashion, so long as it remains operable to at least partially manage grid 110. Often, management node 105 is physically or logically separated from the plurality of HPC nodes 115, jointly represented in grid 110. In the illustrated embodiment, management node 105 may be communicably coupled to grid 110 via link 108. Link 108 may comprise any communication conduit implementing any appropriate communications protocol. In one embodiment, link 108 provides Gigabit or 10 Gigabit Ethernet communications between management node 105 and grid 110.

Grid 110 is a group of nodes 115 interconnected for increased processing power. Typically, grid 110 is a 3D Torus, but it may be a mesh, a hypercube, or any other shape or configuration without departing from the scope of this disclosure. The links between nodes 115 in grid 110 may be serial or parallel analog links, digital links, or any other type of link that can convey electrical or electromagnetic signals such as, for example, fiber or copper. Each node 115 is configured with an integrated switch. This allows node 115 to more easily be the basic construct for the 3D Torus and helps minimize XYZ distances between other nodes 115. Further, this may make copper wiring work in larger systems at up to Gigabit rates with, in some embodiments, the longest cable being less than 5 meters. In short, node 115 is generally optimized for nearest-neighbor communications and increased I/O bandwidth.

Each node 115 may include a cluster agent 132 communicably coupled with cluster management engine 130. Generally, agent 132 receives requests or commands from management node 105 and/or cluster management engine 130. Agent 132 could include any hardware, software, firmware, or combination thereof operable to determine the physical status of node 115 and communicate the processed data, such as through a "heartbeat," to management node 105. In another embodiment, management node 105 may periodically poll agent 132 to determine the status of the associated node 115. Agent 132 may be written in any appropriate computer language such as, for example, C, C++, Assembler, Java, Visual Basic, and others or any combination thereof so long as it remains compatible with at least a portion of cluster management engine 130.

Cluster management engine 130 could include any hardware, software, firmware, or combination thereof operable to dynamically allocate and manage nodes 115 and execute job 150 using nodes 115. For example, cluster management engine 130 may be written or described in any appropriate computer language including C, C++, Java, Visual Basic, assembler, any suitable version of 4GL, and others or any combination thereof. It will be understood that while cluster management engine 130 is illustrated in FIG. 1 as a single multi-tasked module, the features and functionality performed by this engine may be performed by multiple modules such as, for example, a physical layer module, a virtual layer module, a job scheduler, and a presentation engine (as shown in more detail in FIG. 5). Further, while illustrated as external to management node 105, management node 105 typically executes one or more processes associated with cluster management engine 130 and may store cluster management engine 130. Moreover, cluster management engine 130 may be a child or sub-module of another software module without departing from the scope of this disclosure. Therefore, cluster management engine 130 comprises one or more software modules operable to intelligently manage nodes 115 and jobs 150.

Server 102 may include interface 104 for communicating with other computer systems, such as client 120, over network 106 in a client-server or other distributed environment. In certain embodiments, server 102 receives jobs 150 or job policies from network 106 for storage in disk farm 140. Disk farm 140 may also be attached directly to the computational array using the same wideband interfaces that interconnects the nodes. Generally, interface 104 comprises logic encoded in software and/or hardware in a suitable combination and operable to communicate with network 106. More specifically, interface 104 may comprise software supporting one or more communications protocols associated with communications network 106 or hardware operable to communicate physical signals.

Network 106 facilitates wireless or wireline communication between computer server 102 and any other computer, such as clients 120. Indeed, while illustrated as residing between server 102 and client 120, network 106 may also reside between various nodes 115 without departing from the scope of the disclosure. In other words, network 106 encompasses any network, networks, or sub-network operable to facilitate communications between various computing components. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations.

In general, disk farm 140 is any memory, database or storage area network (SAN) for storing jobs 150, profiles, boot images, or other HPC information. According to the illustrated embodiment, disk farm 140 includes one or more storage clients 142. Disk farm 140 may process and route data packets according to any of a number of communication protocols, for example, InfiniBand (IB), Gigabit Ethernet (GE), or FibreChannel (FC). Data packets are typically used to transport data within disk farm 140. A data packet may include a header that has a source identifier and a destination identifier. The source identifier, for example, a source address, identifies the transmitter of information, and the destination identifier, for example, a destination address, identifies the recipient of the information.

Client 120 is any device operable to present the user with a job submission screen or administration via a graphical user interface (GUI) 126. At a high level, illustrated client 120 includes at least GUI 126 and comprises an electronic computing device operable to receive, transmit, process and store any appropriate data associated with system 100. It will be understood that there may be any number of clients 120 communicably coupled to server 102. Further, "client 120" and "user of client 120" may be used interchangeably as appropriate without departing from the scope of this disclosure. Moreover, for ease of illustration, each client is described in terms of being used by one user. But this disclosure contemplates that many users may use one computer to communicate jobs 150 using the same GUI 126.

As used in this disclosure, client 120 is intended to encompass a personal computer, touch screen terminal, workstation, network computer, kiosk, wireless data port, cell phone, personal data assistant (PDA), one or more processors within these or other devices, or any other suitable processing device. For example, client 120 may comprise a computer that includes an input device, such as a keypad, touch screen, mouse, or other device that can accept information, and an output device that conveys information associated with the operation of server 102 or clients 120, including digital data, visual information, or GUI 126. Both the input device and output device may include fixed or removable storage media such as a magnetic computer disk, CD-ROM, or other suitable media to both receive input from and provide output to users of clients 120 through the administration and job submission display, namely GUI 126.

Figure 4A:
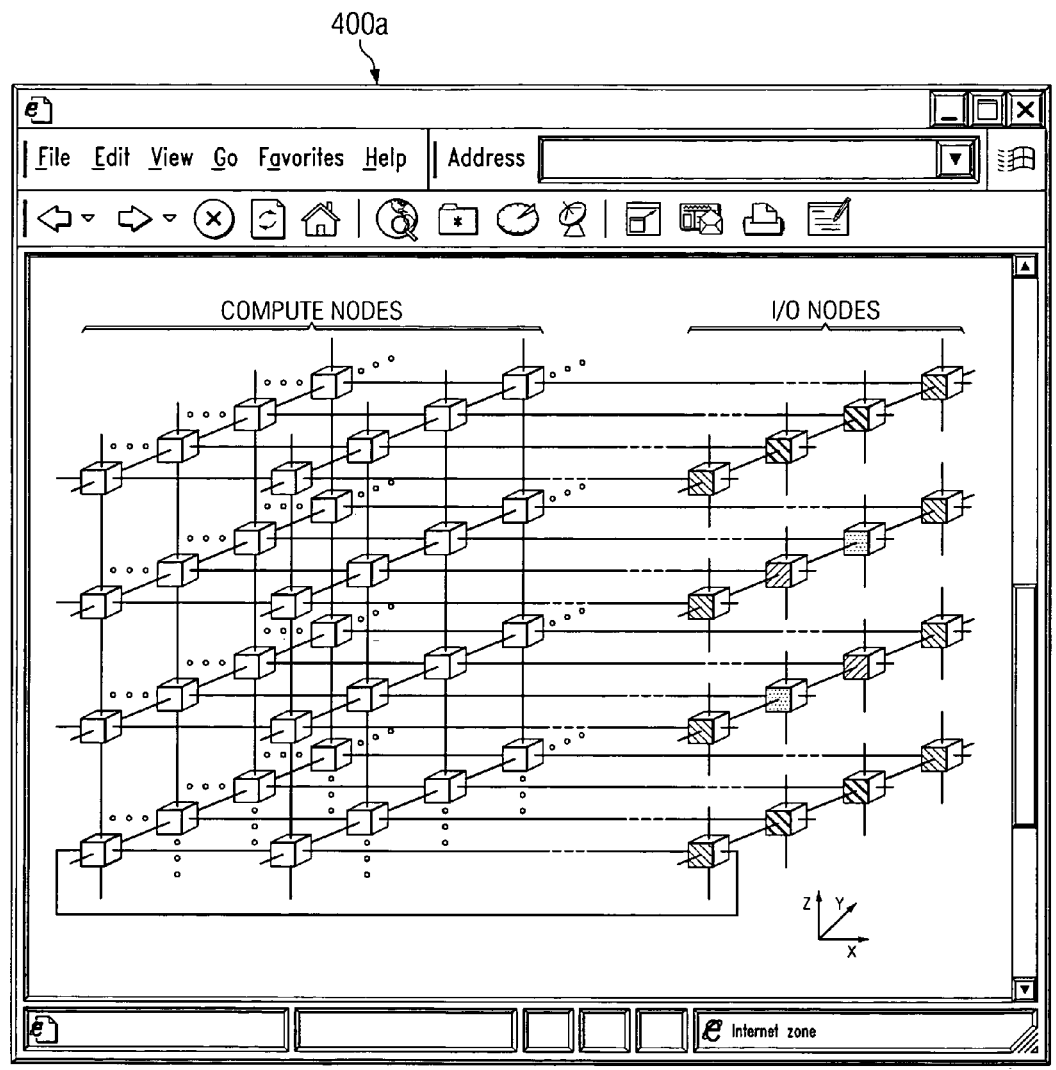
FIGS. 4A-B illustrate various embodiments of a graphical user interface in accordance with the system of FIG. 1.
Figure 4B:
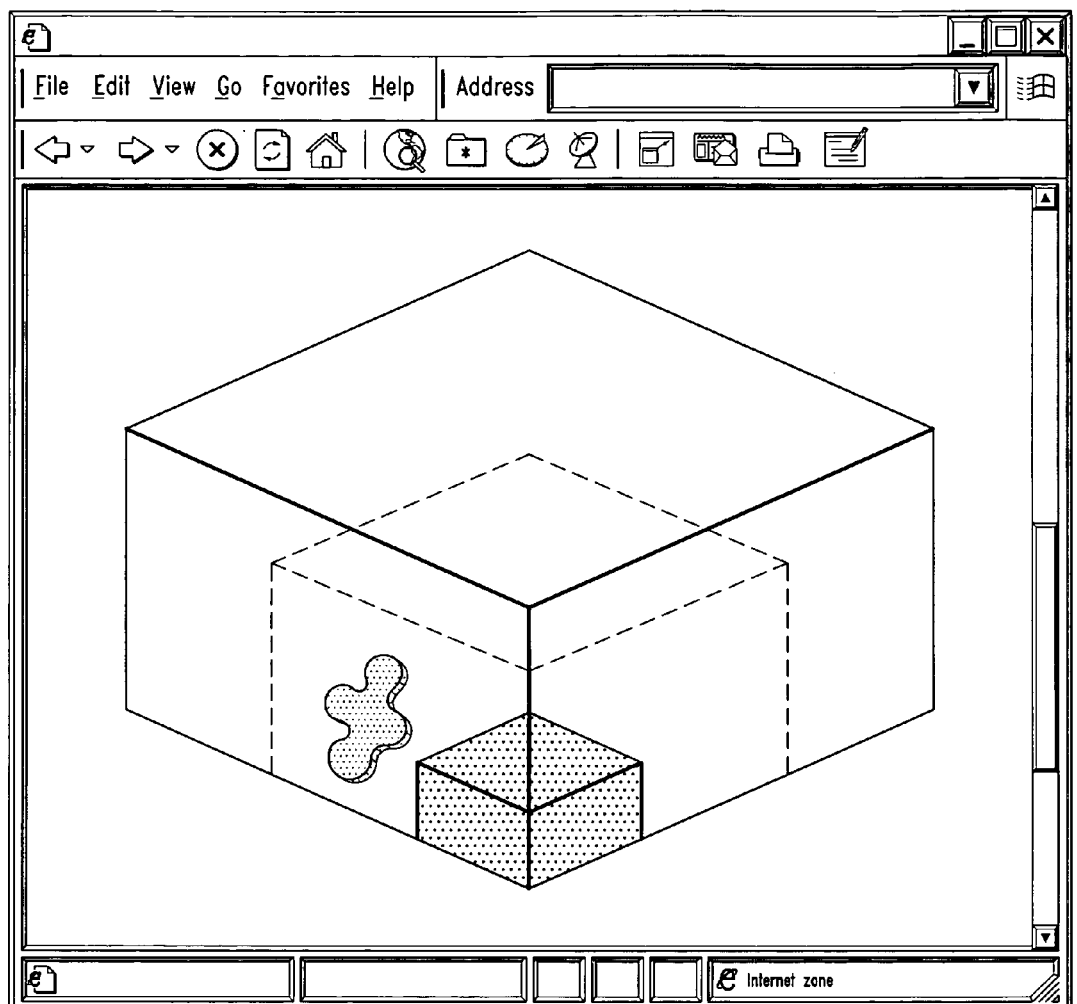

GUI 126 comprises a graphical user interface operable to allow i) the user of client 120 to interface with system 100 to submit one or more jobs 150; and/or ii) the system (or network) administrator using client 120 to interface with system 100 for any suitable supervisory purpose. Generally, GUI 126 provides the user of client 120 with an efficient and user-friendly presentation of data provided by HPC system 100. GUI 126 may comprise a plurality of customizable frames or views having interactive fields, pull-down lists, and buttons operated by the user. In one embodiment, GUI 126 presents a job submission display that presents the various job parameter fields and receives commands from the user of client 120 via one of the input devices. GUI 126 may, alternatively or in combination, present the physical and logical status of nodes 115 to the system administrator, as illustrated in FIGS. 4A-B, and receive various commands from the administrator. Administrator commands may include marking nodes as (un)available, shutting down nodes for maintenance, rebooting nodes, or any other suitable command. Moreover, it should be understood that the term graphical user interface may be used in the singular or in the plural to describe one or more graphical user interfaces and each of the displays of a particular graphical user interface. Therefore, GUI 126 contemplates any graphical user interface, such as a generic web browser, that processes information in system 100 and efficiently presents the results to the user. Server 102 can accept data from client 120 via the web browser (e.g., Microsoft Internet Explorer or Netscape Navigator) and return the appropriate HTML or XML responses using network 106.

In one aspect of operation, HPC server 102 is first initialized or booted. During this process, cluster management engine 130 determines the existence, state, location, and/or other characteristics of nodes 115 in grid 110. As described above, this may be based on a "heartbeat" communicated upon each node's initialization or upon near immediate polling by management node 105. Next, cluster management engine 130 may dynamically allocate various portions of grid 110 to one or more virtual clusters 220 based on, for example, predetermined policies. In one embodiment, cluster management engine 130 continuously monitors nodes 115 for possible failure and, upon determining that one of the nodes 115 failed, effectively managing the failure using any of a variety of recovery techniques. Cluster management engine 130 may also manage and provide a unique execution environment for each allocated node of virtual cluster 220. The execution environment may consist of the hostname, IP address, operating system, configured services, local and shared file systems, and a set of installed applications and data. The cluster management engine 130 may dynamically add or subtract nodes from virtual cluster 220 according to associated policies and according to inter-cluster policies, such as priority.

When a user logs on to client 120, he may be presented with a job submission screen via GUI 126. Once the user has entered the job parameters and submitted job 150, cluster management engine 130 processes the job submission, the related parameters, and any predetermined policies associated with job 150, the user, or the user group. Cluster management engine 130 then determines the appropriate virtual cluster 220 based, at least in part, on this information. Engine 130 then dynamically allocates a job space 230 within virtual cluster 220 and executes job 150 across the allocated nodes 115 using HPC techniques. Based, at least in part, on the increased I/O performance, HPC server 102 may more quickly complete processing of job 150. Upon completion, cluster management engine communicates results 160 to the user.

Figure 2A:
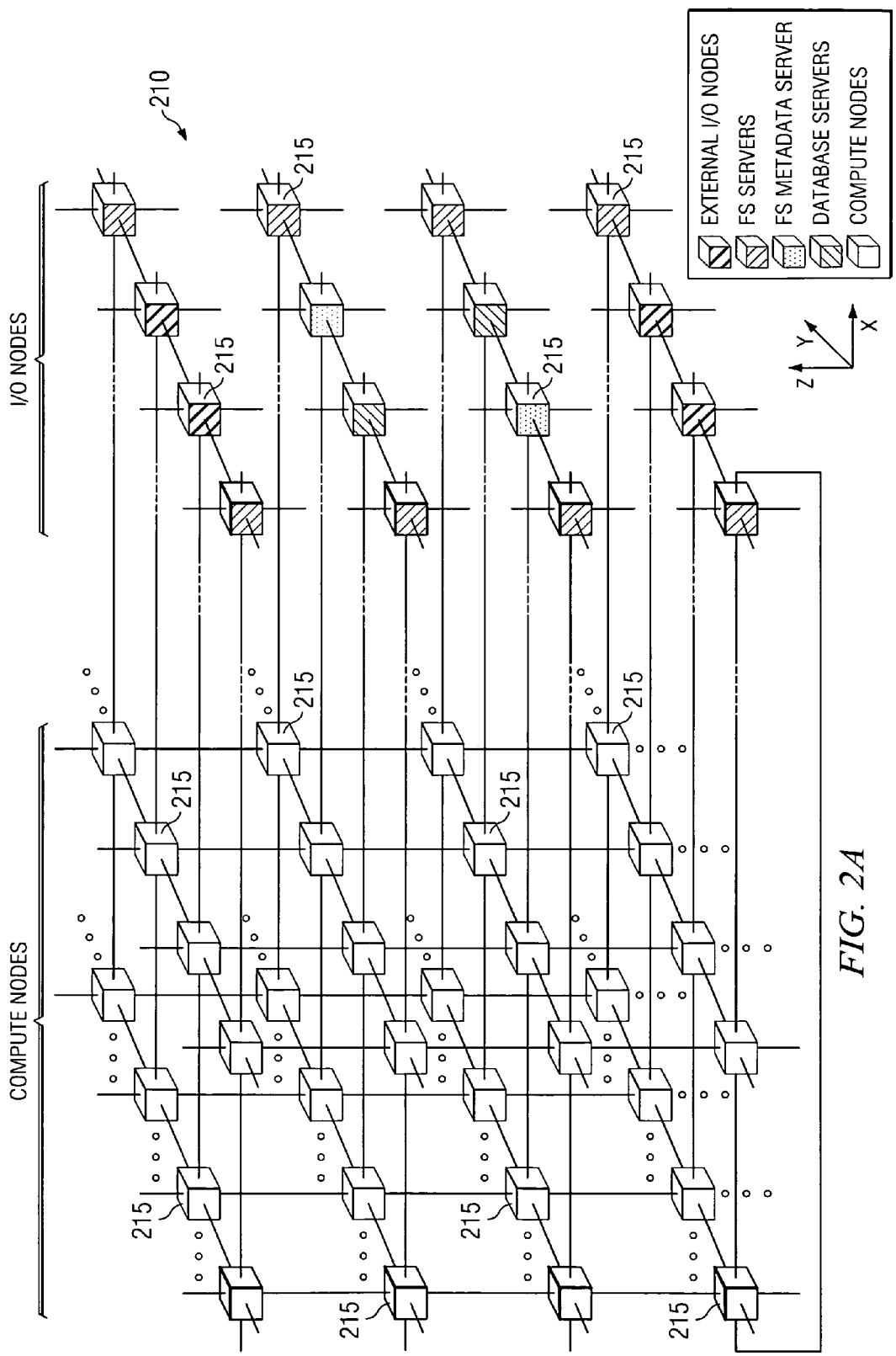
FIGS. 2A-D illustrate various embodiments of the grid in the system of FIG. 1 and the usage thereof.
Figure 2B:
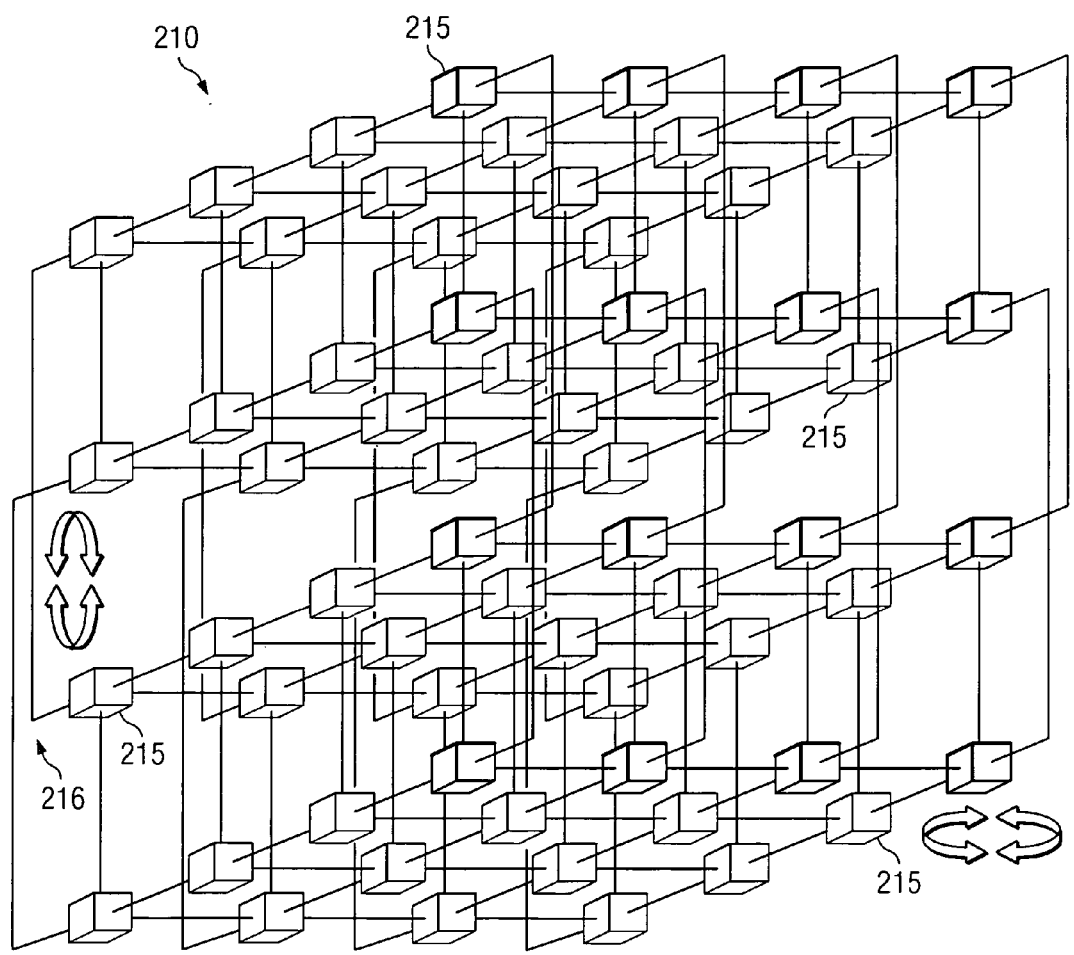

FIGS. 2A-D illustrate various embodiments of grid 210 in system 100 and the usage or topology thereof. FIG. 2A illustrates one configuration, namely a 3D Torus, of grid 210 using a plurality of node types. For example, the illustrated node types are external I/O node, FS server, FS metadata server, database server, and compute node. FIG. 2B illustrates an example of "folding" of grid 210. Folding generally allows for one physical edge of grid 215 to connect to a corresponding axial edge, thereby providing a more robust or edgeless topology. In this embodiment, nodes 215 are wrapped around to provide a near seamless topology connect by node link 216. Node line 216 may be any suitable hardware implementing any communications protocol for interconnecting two or more nodes 215. For example, node line 216 may be copper wire or fiber optic cable implementing Gigabit Ethernet.

Figure 2C:
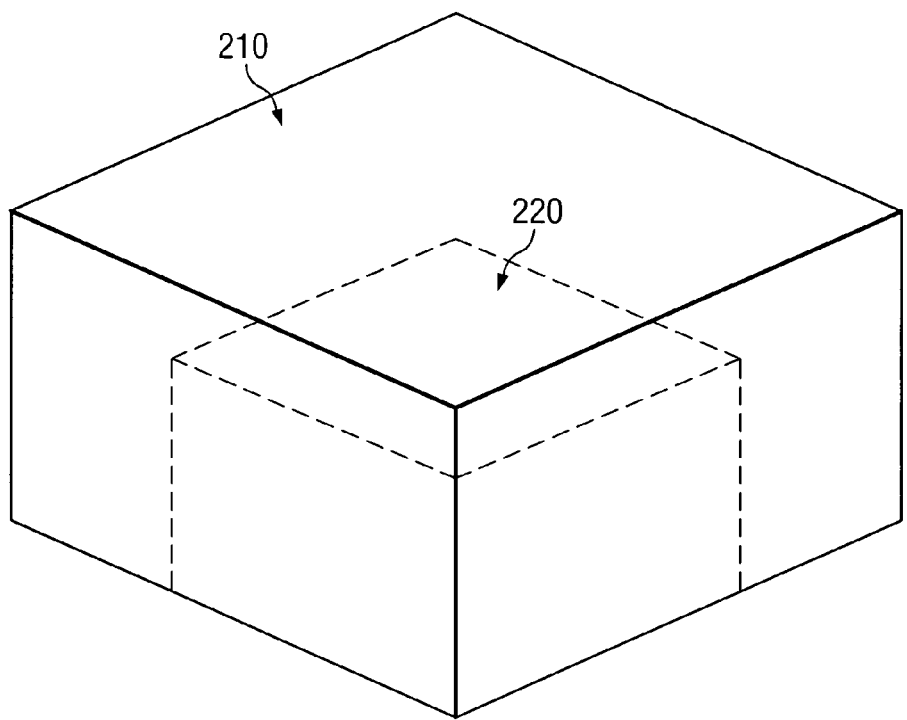

FIG. 2C illustrates grid 210 with one virtual cluster 220 allocated within it. While illustrated with only one virtual cluster 220, there may be any number (including zero) of virtual clusters 220 in grid 210 without departing from the scope of this disclosure. Virtual cluster 220 is a logical grouping of nodes 215 for processing related jobs 150. For example, virtual cluster 220 may be associated with one research group, a department, a lab, or any other group of users likely to submit similar jobs 150. Virtual cluster 220 may be any shape and include any number of nodes 215 within grid 210. Indeed, while illustrated virtual cluster 220 includes a plurality of physically neighboring nodes 215, cluster 220 may be a distributed cluster of logically related nodes 215 operable to process job 150.

Virtual cluster 220 may be allocated at any appropriate time. For example, cluster 220 may be allocated upon initialization of system 100 based, for example, on startup parameters or may be dynamically allocated based, for example, on changed server 102 needs. Moreover, virtual cluster 220 may change its shape and size over time to quickly respond to changing requests, demands, and situations. For example; virtual cluster 220 may be dynamically changed to include an automatically allocated first node 215 in response to a failure of a second node 215, previously part of cluster 220. In certain embodiments, clusters 220 may share nodes 215 as processing requires.

Figure 2D:
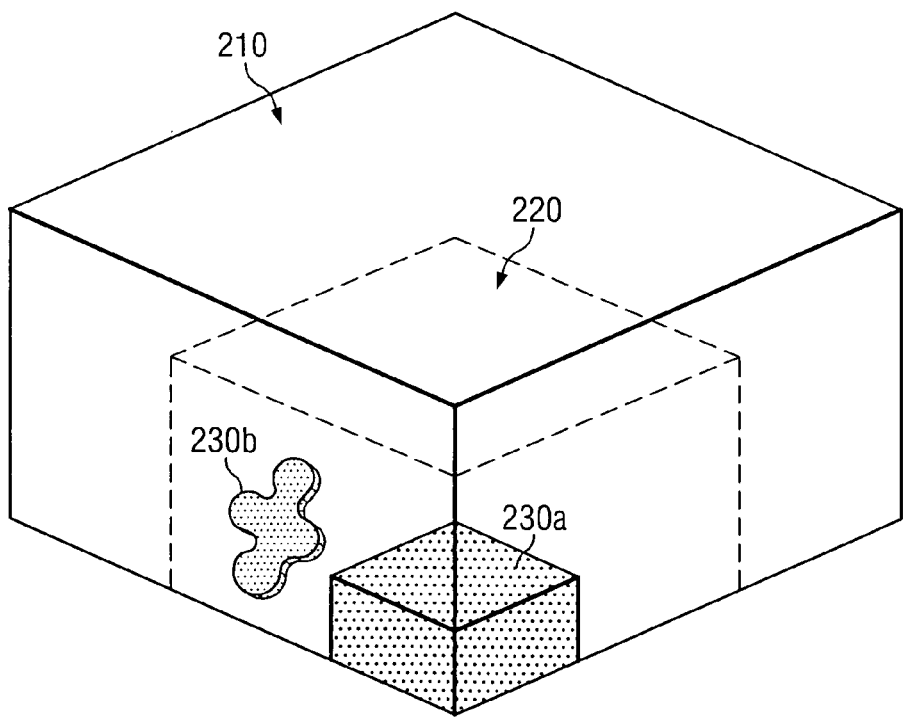

FIG. 2D illustrates various job spaces, 230a and 230b respectively, allocated within example virtual cluster 220. Generally, job space 230 is a set of nodes 215 within virtual cluster 220 dynamically allocated to complete received job 150. Typically, there is one job space 230 per executing job 150 and vice versa, but job spaces 230 may share nodes 215 without departing from the scope of the disclosure. The dimensions of job space 230 may be manually input by the user or administrator or dynamically determined based on job parameters, policies, and/or any other suitable characteristic.

Figure 3A:
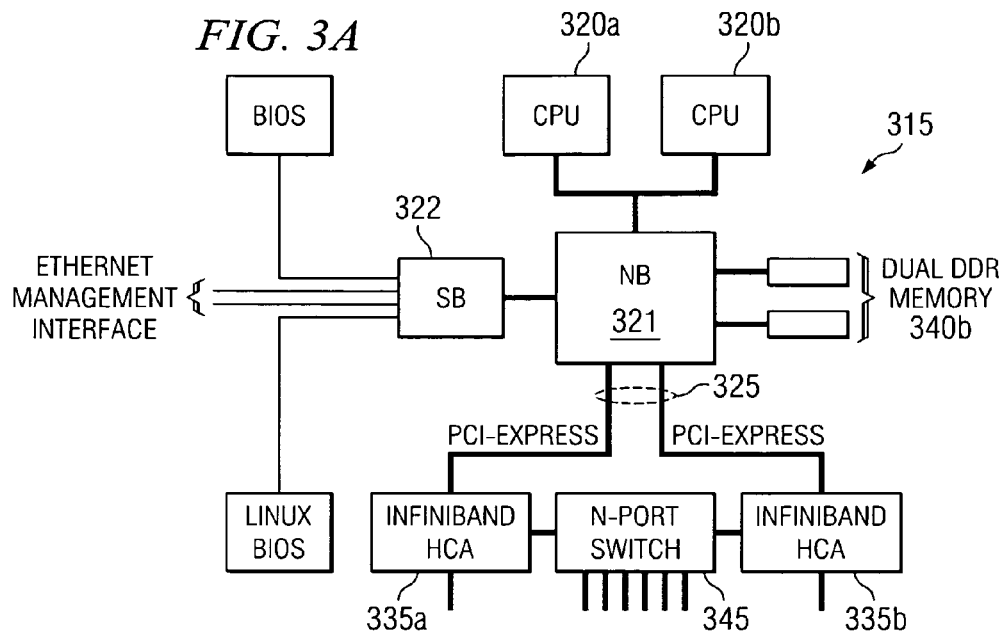
FIGS. 3A-C illustrate various embodiments of individual nodes in the system of FIG. 1.
Figure 3B:
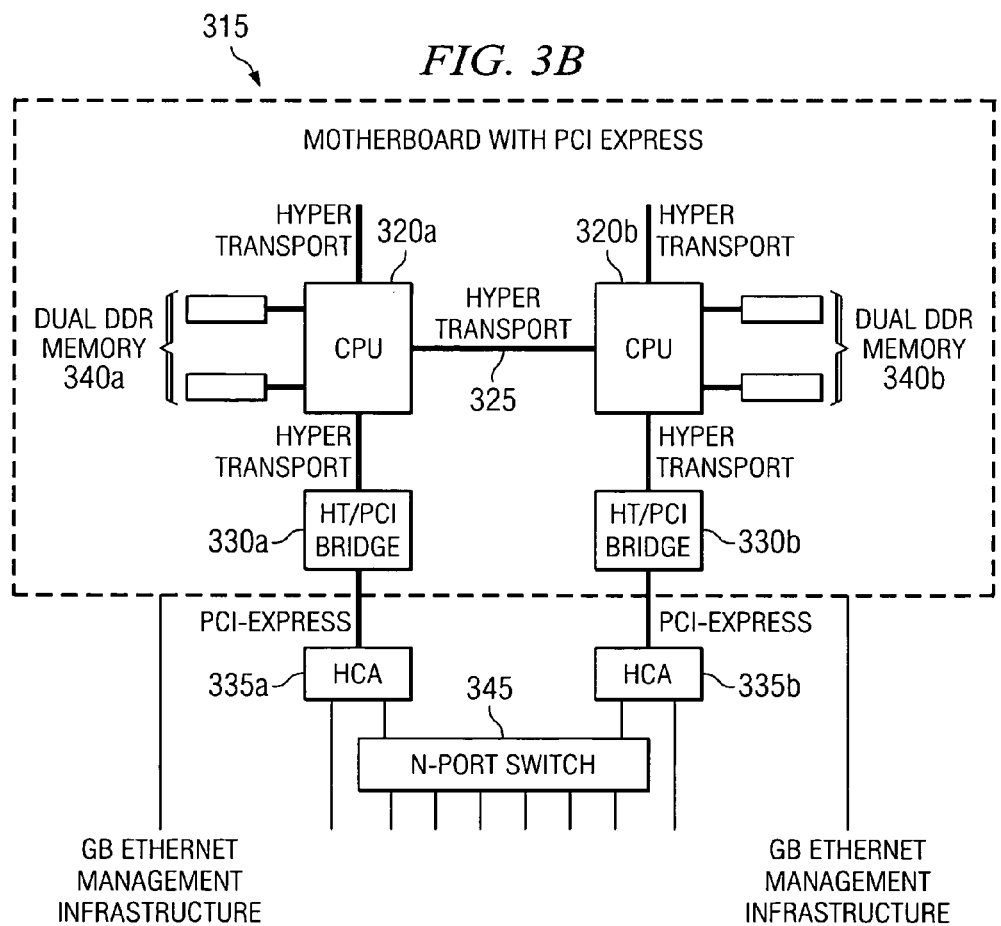
Figure 3C:
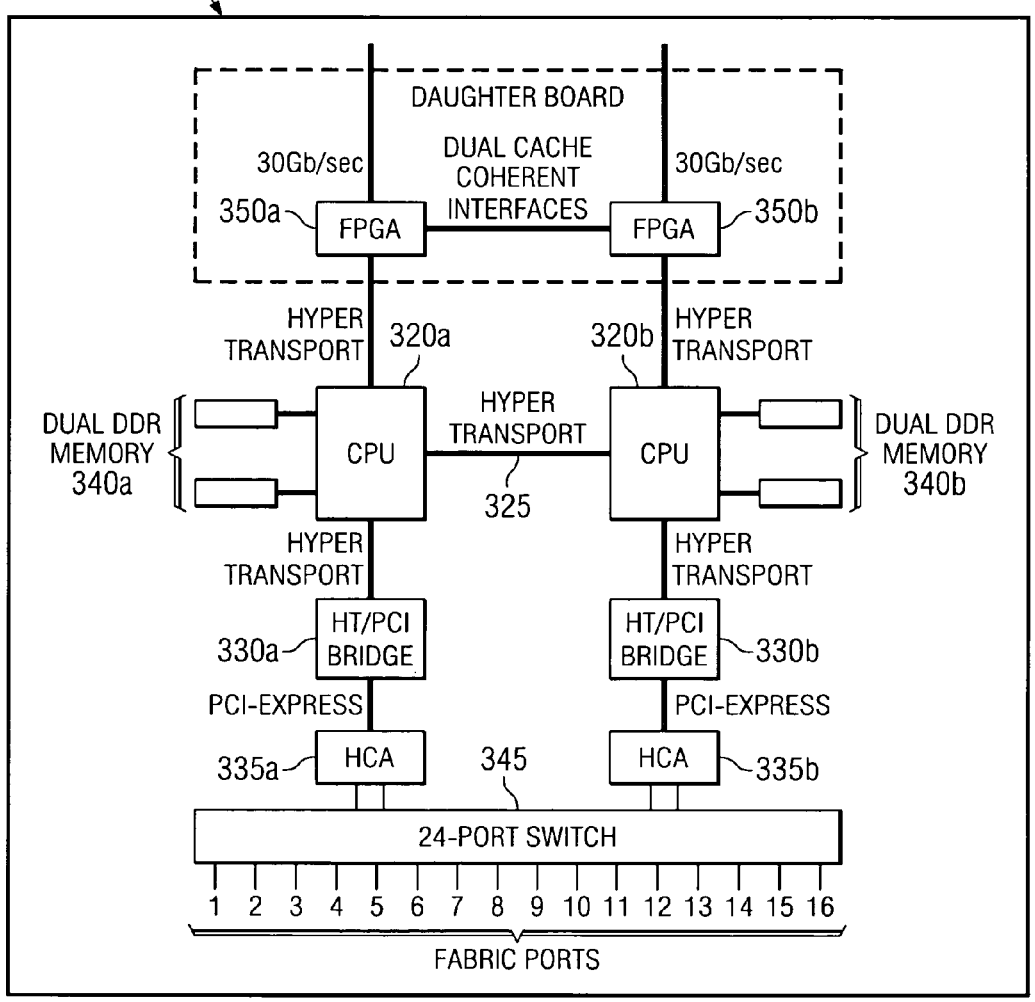

FIGS. 3A-C illustrate various embodiments of individual nodes 115 in grid 110. In the illustrated, but example, embodiments, nodes 115 are represented by blades 315. Blade 315 comprises any computing device in any orientation operable to process all or a portion, such as a thread or process, of job 150. For example, blade 315 may be a standard Xeon64™ motherboard, a standard PCI-Express Opteron™ motherboard, or any other suitable computing card.

Blade 315 is an integrated fabric architecture that distributes the fabric switching components uniformly across nodes 115 in grid 110, thereby possibly reducing or eliminating any centralized switching function, increasing the fault tolerance, and allowing message passing in parallel. More specifically, blade 315 includes an integrated switch 345. Switch 345 includes any number of ports that may allow for different topologies. For example, switch 345 may be an eight-port switch that enables a tighter three-dimensional mesh or 3D Torus topology. These eight ports include two "X" connections for linking to neighbor nodes 115 along an X-axis, two "Y" connections for linking to neighbor nodes 115 along a Y-axis, two "Z" connections for linking to neighbor nodes 115 along a Z-axis, and two connections for linking to management node 105. In one embodiment, switch 345 may be a standard eight port Infiniband-4x switch IC, thereby easily providing built-in fabric switching. Switch 345 may also comprise a twenty-four port switch that allows for multidimensional topologies, such a 4-D Torus, or other non-traditional topologies of greater than three dimensions. Moreover, nodes 115 may further interconnected along a diagonal axis, thereby reducing jumps or hops of communications between relatively distant nodes 115. For example, a first node 115 may be connected with a second node 115 that physically resides along a northeasterly axis several three dimensional "jumps" away.

FIG. 3A illustrates a blade 315 that, at a high level, includes at least two processors 320a and 320b, local or remote memory 340, and integrated switch (or fabric) 345. Processor 320 executes instructions and manipulates data to perform the operations of blade 315 such as, for example, a central processing unit (CPU). Reference to processor 320 is meant to include multiple processors 320 where applicable. In one embodiment, processor 320 may comprise a Xeon64 or Itanium™ processor or other similar processor or derivative thereof. For example, the Xeon64 processor may be a 3.4 GHz chip with a 2 MB Cache and HyperTreading. In this embodiment, the dual processor module may include a native PCI/Express that improves efficiency. Accordingly, processor 320 has efficient memory bandwidth and, typically, has the memory controller built into the processor chip.

Blade 315 may also include Northbridge 321, Southbridge 322, PCI channel 325, HCA 335, and memory 340. Northbridge 321 communicates with processor 320 and controls communications with memory 340, a PCI bus, Level 2 cache, and any other related components. In one embodiment, Northbridge 321 communicates with processor 320 using the frontside bus (FSB). Southbridge 322 manages many of the input/output (I/O) functions of blade 315. In another embodiment, blade 315 may implement the Intel Hub Architecture (IHA™), which includes a Graphics and AGP Memory Controller Hub (GMCH) and an I/O Controller Hub (ICH).

PCI channel 325 comprises any high-speed, low latency link designed to increase the communication speed between integrated components. This helps reduce the number of buses in blade 315, which can reduce system bottlenecks. HCA 335 comprises any component providing channel-based I/O within server 102. Each HCA 335 may provide a total bandwidth of 2.65 GB/sec, thereby allowing 1.85 GB/sec per PE to switch 345 and 800 MB/sec per PE to I/O such as, for example, BIOS (Basic Input/Output System), an Ethernet management interface, and others. This further allows the total switch 345 bandwidth to be 3.7 GB/sec for 13.6 Gigaflops/sec peak or 0.27 Bytes/Flop I/O rate is 50 MB/sec per Gigaflop.

Memory 340 includes any memory or database module and may take the form of volatile or non-volatile memory including, without limitation, magnetic media, optical media, flash memory, random access memory (RAM), read-only memory (ROM), removable media, or any other suitable local or remote memory component. In the illustrated embodiment, memory 340 is comprised of 8 GB of dual double data rate (DDR) memory components operating at least 6.4 GB/s. Memory 340 may include any appropriate data for managing or executing HPC jobs 150 without departing from this disclosure.

FIG. 3B illustrates a blade 315 that includes two processors 320a and 320b, memory 340, HyperTransport/peripheral component interconnect (HT/PCI) bridges 330a and 330b, and two HCAs 335a and 335b.

Example blade 315 includes at least two processors 320. Processor 320 executes instructions and manipulates data to perform the operations of blade 315 such as, for example, a central processing unit (CPU). In the illustrated embodiment, processor 320 may comprise an Opteron processor or other similar processor or derivative. In this embodiment, the Opteron processor design supports the development of a well balanced building block for grid 110. Regardless, the dual processor module may provide four to five Gigaflop usable performance and the next generation technology helps solve memory bandwidth limitation. But blade 315 may more than two processors 320 without departing from the scope of this disclosure. Accordingly, processor 320 has efficient memory bandwidth and, typically, has the memory controller built into the processor chip. In this embodiment, each processor 320 has one or more HyperTransport™ (or other similar conduit type) links 325.

Generally, HT link 325 comprises any high-speed, low latency link designed to increase the communication speed between integrated components. This helps reduce the number of buses in blade 315, which can reduce system bottlenecks. HT link 325 supports processor to processor communications for cache coherent multiprocessor blades 315. Using HT links 325, up to eight processors 320 may be placed on blade 315. If utilized, HyperTransport may provide bandwidth of 6.4 GB/sec, 12.8, or more, thereby providing a better than forty-fold increase in data throughput over legacy PCI buses. Further HyperTransport technology may be compatible with legacy I/O standards, such as PCI, and other technologies, such as PCI-X.

Blade 315 further includes HT/PCI bridge 330 and HCA 335. PCI bridge 330 may be designed in compliance with PCI Local Bus Specification Revision 2.2 or 3.0 or PCI Express Base Specification 1.0a or any derivatives thereof. HCA 335 comprises any component providing channel-based I/O within server 102. In one embodiment, HCA 335 comprises an Infiniband HCA. InfiniBand channels are typically created by attaching host channel adapters and target channel adapters, which enable remote storage and network connectivity into an InfiniBand fabric, illustrated in more detail in FIG. 3B. Hypertransport 325 to PCI-Express Bridge 330 and HCA 335 may create a full-duplex 2 GB/sec I/O channel for each processor 320. In certain embodiments, this provides sufficient bandwidth to support processor-processor communications in distributed HPC environment 100. Further, this provides blade 315 with I/O performance nearly or substantially balanced with the performance of processors 320.

FIG. 3C illustrates another embodiment of blade 315 including a daughter board. In this embodiment, the daughter board may support 3.2 GB/sec or higher cache coherent interfaces. The daughter board is operable to include one or more Field Programmable Gate Arrays (FPGAs) 350. For example, the illustrated daughter board includes two FPGAs 350, represented by 350a and 350b, respectively. Generally, FPGA 350 provides blade 315 with non-standard interfaces, the ability to process custom algorithms, vector processors for signal, image, or encryption/decryption processing applications, and high bandwidth. For example, FPGA may supplement the ability of blade 315 by providing acceleration factors of ten to twenty times the performance of a general purpose processor for special functions such as, for example, low precision Fast Fourier Transform (FFT) and matrix arithmetic functions.

The preceding illustrations and accompanying descriptions provide exemplary diagrams for implementing various scaleable nodes 115 (illustrated as example blades 315). However, these figures are merely illustrative and system 100 contemplates using any suitable combination and arrangement of elements for implementing various scalability schemes. Although the present invention has been illustrated and described, in part, in regard to blade server 102, those of ordinary skill in the art will recognize that the teachings of the present invention may be applied to any clustered HPC server environment. Accordingly, such clustered servers 102 that incorporate the techniques described herein may be local or a distributed without departing from the scope of this disclosure. Thus, these servers 102 may include HPC modules (or nodes 115) incorporating any suitable combination and arrangement of elements for providing high performance computing power, while reducing I/O latency. Moreover, the operations of the various illustrated HPC modules may be combined and/or separated as appropriate. For example, grid 110 may include a plurality of substantially similar nodes 115 or various nodes 115 implementing differing hardware or fabric architecture.

FIGS. 4A-B illustrate various embodiments of a management graphical user interface 400 in accordance with the system 100. Often, management GUI 400 is presented to client 120 using GUI 126. In general, management GUI 400 presents a variety of management interactive screens or displays to a system administrator and/or a variety of job submission or profile screens to a user. These screens or displays are comprised of graphical elements assembled into various views of collected information. For example, GUI 400 may present a display of the physical health of grid 110 (illustrated in FIG. 4A) or the logical allocation or topology of nodes 115 in grid 110 (illustrated in FIG. 4B).

FIG. 4A illustrates example display 400a. Display 400a may include information presented to the administrator for effectively managing nodes 115. The illustrated embodiment includes a standard web browser with a logical "picture" or screenshot of grid 110. For example, this picture may provide the physical status of grid 110 and the component nodes 115. Each node 115 may be one of any number of colors, with each color representing various states. For example, a failed node 115 may be red, a utilized or allocated node 115 may be black, and an unallocated node 115 may be shaded. Further, display 400a may allow the administrator to move the pointer over one of the nodes 115 and view the various physical attributes of it. For example, the administrator may be presented with information including "node," "availability," "processor utilization," "memory utilization," "temperature," "physical location," and "address." Of course, these are merely example data fields and any appropriate physical or logical node information may be display for the administrator. Display 400a may also allow the administrator to rotate the view of grid 110 or perform any other suitable function.

FIG. 4B illustrates example display 400b. Display 400b presents a view or picture of the logical state of grid 100. The illustrated embodiment presents the virtual cluster 220 allocated within grid 110. Display 400b further displays two example job spaces 230 allocate within cluster 220 for executing one or more jobs 150. Display 400b may allow the administrator to move the pointer over graphical virtual cluster 220 to view the number of nodes 115 grouped by various statuses (such as allocated or unallocated). Further, the administrator may move the pointer over one of the job spaces 230 such that suitable job information is presented. For example, the administrator may be able to view the job name, start time, number of nodes, estimated end time, processor usage, I/O usage, and others.

It will be understood that management GUI 126 (represented above by example displays 400a and 400b, respectively) is for illustration purposes only and may include none, some, or all of the illustrated graphical elements as well as additional management elements not shown.

Figure 5:
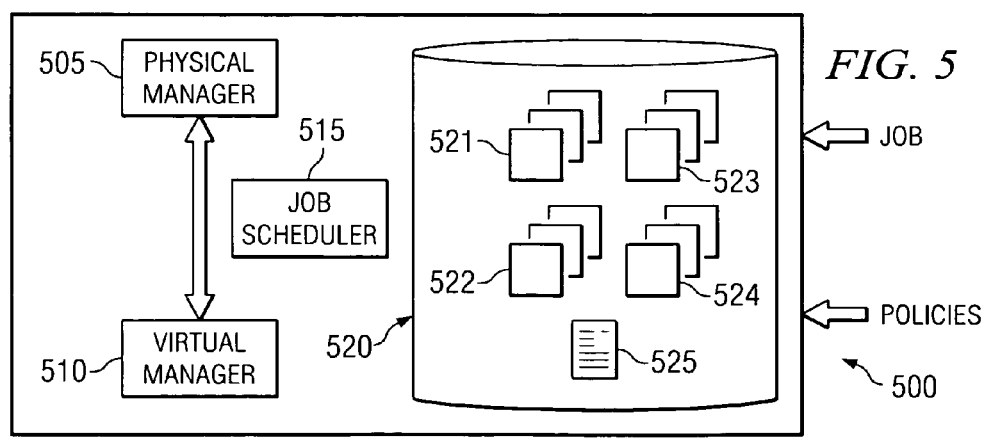
FIG. 5 illustrates one embodiment of the cluster management software in accordance with the system in FIG. 1.

FIG. 5 illustrates one embodiment of cluster management engine 130, shown here as engine 500, in accordance with system 100. In this embodiment, cluster management engine 500 includes a plurality of sub-modules or components: physical manager 505, virtual manager 510, job scheduler 515, and local memory or variables 520.

Physical manager 505 is any software, logic, firmware, or other module operable to determine the physical health of various nodes 115 and effectively manage nodes 115 based on this determined health. Physical manager may use this data to efficiently determine and respond to node 115 failures. In one embodiment, physical manager 505 is communicably coupled to a plurality of agents 132, each residing on one node 115. As described above, agents 132 gather and communicate at least physical information to manager 505. Physical manager 505 may be further operable to communicate alerts to a system administrator at client 120 via network 106.

Virtual manager 510 is any software, logic, firmware, or other module operable to manage virtual clusters 220 and the logical state of nodes 115. Generally, virtual manager 510 links a logical representation of node 115 with the physical status of node 115. Based on these links, virtual manager 510 may generate virtual clusters 220 and process various changes to these clusters 220, such as in response to node failure or a (system or user) request for increased HPC processing. Virtual manager 510 may also communicate the status of virtual cluster 220, such as unallocated nodes 115, to job scheduler 515 to enable dynamic backfilling of unexecuted, or queued, HPC processes and jobs 150. Virtual manager 510 may further determine the compatibility of job 150 with particular nodes 115 and communicate this information to job scheduler 515. In certain embodiments, virtual manager 510 may be an object representing an individual virtual cluster 220.

Cluster management engine 500 may also include job scheduler 515. Job scheduler sub-module 515 is a topology-aware module that processes aspects of the system's resources, as well with the processors and the time allocations, to determine an optimum job space 230 and time. Factors that are often considered include processors, processes, memory, interconnects, disks, visualization engines, and others. In other words, job scheduler 515 typically interacts with GUI 126 to receive jobs 150, physical manager 505 to ensure the health of various nodes 115, and virtual manager 510 to dynamically allocate job space 230 within a certain virtual cluster 220. This dynamic allocation is accomplished through various algorithms that often incorporates knowledge of the current topology of grid 110 and, when appropriate, virtual cluster 220. Job scheduler 515 handles both batch and interactive execution of both serial and parallel programs. Scheduler 515 should also provide a way to implement policies 524 on selecting and executing various problems presented by job 150.

Cluster management engine 500, such as through job scheduler 515, may be further operable to perform efficient check-pointing. Restart dumps typically comprise over seventy-five percent of data written to disk. This I/O is often done so that processing is not lost to a platform failure. Based on this, a file system's I/O can be segregated into two portions: productive I/O and defensive I/O. Productive I/O is the writing of data that the user calls for to do science such as, for example, visualization dumps, traces of key physics variables over time, and others. Defensive I/O is performed to manage a large simulation run over a substantial period of time. Accordingly, increased I/O bandwidth greatly reduces the time and risk involved in check-pointing.

Returning to engine 500, local memory 520 comprises logical descriptions (or data structures) of a plurality of features of system 100. Local memory 520 may be stored in any physical or logical data storage operable to be defined, processed, or retrieved by compatible code. For example, local memory 520 may comprise one or more extensible Markup Language (XML) tables or documents. The various elements may be described in terms of SQL statements or scripts, Virtual Storage Access Method (VSAM) files, flat files, binary data files, Btrieve files, database files, or comma-separated-value (CSV) files. It will be understood that each element may comprise a variable, table, or any other suitable data structure. Local memory 520 may also comprise a plurality of tables or files stored on one server 102 or across a plurality of servers or nodes. Moreover, while illustrated as residing inside engine 500, some or all of local memory 520 may be internal or external without departing from the scope of this disclosure.

Illustrated local memory 520 includes physical list 521, virtual list 522, group file 523, policy table 524, and job queue 525. But, while not illustrated, local memory 520 may include other data structures, including a job table and audit log, without departing from the scope of this disclosure. Returning to the illustrated structures, physical list 521 is operable to store identifying and physical management information about node 115. Physical list 521 may be a multi-dimensional data structure that includes at least one record per node 115. For example, the physical record may include fields such as "node," "availability," "processor utilization," "memory utilization," "temperature," "physical location," "address," "boot images," and others. It will be understood that each record may include none, some, or all of the example fields. In one embodiment, the physical record may provide a foreign key to another table, such as, for example, virtual list 522.

Virtual list 522 is operable to store logical or virtual management information about node 115. Virtual list 522 may be a multi-dimensional data structure that includes at least one record per node 115. For example, the virtual record may include fields such as "node," "availability," "job," "virtual cluster," "secondary node," "logical location," "compatibility," and others. It will be understood that each record may include none, some, or all of the example fields. In one embodiment, the virtual record may include a link to another table such as, for example, group file 523.

Group file 523 comprises one or more tables or records operable to store user group and security information, such as access control lists (or ACLs). For example, each group record may include a list of available services, nodes 115, or jobs for a user. Each logical group may be associated with a business group or unit, a department, a project, a security group, or any other collection of one or more users that are able to submit jobs 150 or administer at least part of system 100. Based on this information, cluster management engine 500 may determine if the user submitting job 150 is a valid user and, if so, the optimum parameters for job execution. Further, group table 523 may associate each user group with a virtual cluster 220 or with one or more physical nodes 115, such as nodes residing within a particular group's domain. This allows each group to have an individual processing space without competing for resources. However, as described above, the shape and size of virtual cluster 220 may be dynamic and may change according to needs, time, or any other parameter.

Policy table 524 includes one or more policies. It will be understood that policy table 524 and policy 524 may be used interchangeably as appropriate. Policy 524 generally stores processing and management information about jobs 150 and/or virtual clusters 220. For example, policies 524 may include any number of parameters or variables including problem size, problem run time, timeslots, preemption, users' allocated share of node 115 or virtual cluster 220, and such.

Job queue 525 represents one or more streams of jobs 150 awaiting execution. Generally, queue 525 comprises any suitable data structure, such as a bubble array, database table, or pointer array, for storing any number (including zero) of jobs 150 or reference thereto. There may be one queue 525 associated with grid 110 or a plurality of queues 525, with each queue 525 associated with one of the unique virtual clusters 220 within grid 110.

In one aspect of operation, cluster management engine 500 receives job 150, made up of N tasks which cooperatively solve a problem by performing calculations and exchanging information. Cluster management engine 500 allocates N nodes 115 and assigns each of the N tasks to one particular node 515 using any suitable technique, thereby allowing the problem to be solved efficiently. For example, cluster management engine 500 may utilize job parameters, such as job task placement strategy, supplied by the user. Regardless, cluster management engine 500 attempts to exploit the architecture of server 102, which in turn provides the quicker turnaround for the user and likely improves the overall throughput for system 100.

In one embodiment, cluster management engine 500 then selects and allocates nodes 115 according to any of the following example topologies:

Specified 2D (x,y) or 3D (x,y,z)—Nodes 115 are allocated and tasks may be ordered in the specified dimensions, thereby preserving efficient neighbor to neighbor communication. The specified topology manages a variety of jobs 150 where it is desirable that the physical communication topology match the problem topology allowing the cooperating tasks of job 150 to communicate frequently with neighbor tasks. For example, a request of 8 tasks in a 2×2×2 dimension (2, 2, 2) will be allocated in a cube. For best-fit purposes, 2D allocations can be "folded" into 3 dimensions (as discussed in FIG. 2D), while preserving efficient neighbor to neighbor communications. Cluster management engine 500 may be free to allocate the specified dimensional shape in any orientation. For example, a 2×2×8 box may be allocated within the available physical nodes vertically or horizontally Best Fit Cube—cluster management engine 500 allocates N nodes 115 in a cubic volume. This topology efficiently handles jobs 150 allowing cooperating tasks to exchange data with any other tasks by minimizing the distance between any two nodes 115.

Best Fit Sphere—cluster management engine 500 allocates N nodes 115 in a spherical volume. For example, the first task may be placed in the center node 115 of the sphere with the rest of the tasks placed on nodes 115 surrounding the center node 115. It will be understood that the placement order of the remaining tasks is not typically critical. This topology may minimize the distance between the first task and all other tasks. This efficiently handles a large class of problems where tasks 2–N communicate with the first task, but not with each other.

Random—cluster management engine 500 allocates N nodes 115 with reduced consideration for where nodes 115 are logically or physically located. In one embodiment, this topology encourages aggressive use of grid 110 for backfilling purposes, with little impact to other jobs 150.

It will be understood that the prior topologies and accompanying description are for illustration purposes only and may not depict actual topologies used or techniques for allocating such topologies.

Cluster management engine 500 may utilize a placement weight, stored as a job 150 parameter or policy 524 parameter. In one embodiment, the placement weight is a modifier value between 0 and 1, which represents how aggressively cluster management engine 500 should attempt to place nodes 115 according to the requested task (or process) placement strategy. In this example, a value of 0 represents placing nodes 115 only if the optimum strategy (or dimensions) is possible and a value of 1 represents placing nodes 115 immediately, as long as there are enough free or otherwise available nodes 115 to handle the request. Typically, the placement weight does not override administrative policies 524 such as resource reservation, in order to prevent starvation of large jobs 150 and preserve the job throughput of HPC system 100.

The preceding illustration and accompanying description provide an exemplary modular diagram for engine 500 implementing logical schemes for managing nodes 115 and jobs 150. However, this figure is merely illustrative and system 100 contemplates using any suitable combination and arrangement of logical elements for implementing these and other algorithms. Thus, these software modules may include any suitable combination and arrangement of elements for effectively managing nodes 115 and jobs 150. Moreover, the operations of the various illustrated modules may be combined and/or separated as appropriate.

Figure 6:
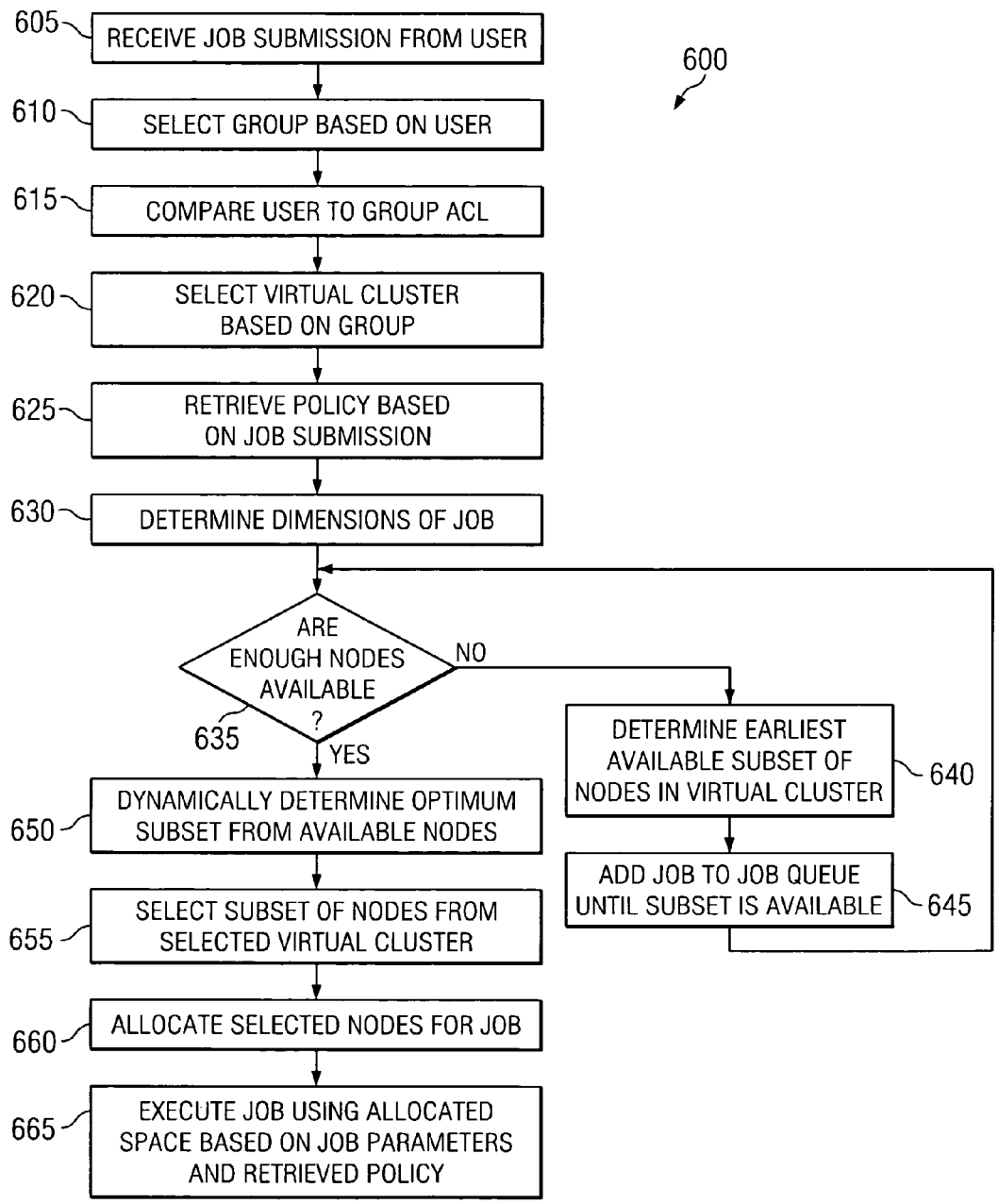
FIG. 6 is a flowchart illustrating a method for submitting a batch job in accordance with the high-performance computing system of FIG. 1.

FIG. 6 is a flowchart illustrating an example method 600 for dynamically processing a job submission in accordance with one embodiment of the present disclosure. Generally, FIG. 6 describes method 600, which receives a batch job submission, dynamically allocates nodes 115 into a job space 230 based on the job parameters and associated policies 524, and executes job 150 using the allocated space. The following description focuses on the operation of cluster management module 130 in performing method 600. But system 100 contemplates using any appropriate combination and arrangement of logical elements implementing some or all of the described functionality, so long as the functionality remains appropriate.

Method 600 begins at step 605, where HPC server 102 receives job submission 150 from a user. As described above, in one embodiment the user may submit job 150 using client 120. In another embodiment, the user may submit job 150 directly using HPC server 102. Next, at step 610, cluster management engine 130 selects group 523 based upon the user. Once the user is verified, cluster management engine 130 compares the user to the group access control list (ACL) at step 615. But it will be understood that cluster management engine 130 may use any appropriate security technique to verify the user. Based upon determined group 523, cluster management engine 130 determines if the user has access to the requested service. Based on the requested service and hostname, cluster management engine 130 selects virtual cluster 220 at step 620. Typically, virtual cluster 220 may be identified and allocated prior to the submission of job 150. But, in the event virtual cluster 220 has not been established, cluster management engine 130 may automatically allocate virtual cluster 220 using any of the techniques described above. Next, at step 625, cluster management engine 130 retrieves policy 524 based on the submission of job 150. In one embodiment, cluster management engine 130 may determine the appropriate policy 524 associated with the user, job 150, or any other appropriate criteria. Cluster management engine 130 then determines or otherwise calculates the dimensions of job 150 at step 630. It will be understood that the appropriate dimensions may include length, width, height, or any other appropriate parameter or characteristic. As described above, these dimensions are used to determine the appropriate job space 230 (or subset of nodes 115) within virtual cluster 220. After the initial parameters have been established, cluster management 130 attempts to execute job 150 on HPC server 102 in steps 635 through 665.

At decisional step 635, cluster management engine 130 determines if there are enough available nodes to allocate the desired job space 230, using the parameters already established. If there are not enough nodes 115, then cluster management engine 130 determines the earliest available subset 230 of nodes 115 in virtual cluster 220 at step 640. Then, cluster management engine 130 adds job 150 to job queue 125 until the subset 230 is available at step 645. Processing then returns to decisional step 635. Once there are enough nodes 115 available, then cluster management engine 130 dynamically determines the optimum subset 230 from available nodes 115 at step 650. It will be understood that the optimum subset 230 may be determined using any appropriate criteria, including fastest processing time, most reliable nodes 115, physical or virtual locations, or first available nodes 115. At step 655, cluster management engine 130 selects the determined subset 230 from the selected virtual cluster 220. Next, at step 660, cluster management engine 130 allocates the selected nodes 115 for job 150 using the selected subset 230. According to one embodiment, cluster management engine 130 may change the status of nodes 115 in virtual node list 522 from "unallocated" to "allocated". Once subset 230 has been appropriately allocated, cluster management engine 130 executes job 150 at step 665 using the allocated space based on the job parameters, retrieved policy 524, and any other suitable parameters. At any appropriate time, cluster management engine 130 may communicate or otherwise present job results 160 to the user. For example, results 160 may be formatted and presented to the user via GUI 126.

FIG. 7 is a flowchart illustrating an example method 700 for dynamically backfilling a virtual cluster 220 in grid 110 in accordance with one embodiment of the present disclosure. At a high level, method 700 describes determining available space in virtual cluster 220, determining the optimum job 150 that is compatible with the space, and executing the determined job 150 in the available space. The following description will focus on the operation of cluster management module 130 in performing this method. But, as with the previous flowchart, system 100 contemplates using any appropriate combination and arrangement of logical elements implementing some or all of the described functionality.

Method 700 begins at step 705, where cluster management engine 130 sorts job queue 525. In the illustrated embodiment, cluster management engine 130 sorts the queue 525 based on the priority of jobs 150 stored in the queue 525. But it will be understood that cluster management engine 130 may sort queue 525 using any suitable characteristic such that the appropriate or optimal job 150 will be executed. Next, at step 710, cluster management engine 130 determines the number of available nodes 115 in one of the virtual clusters 220. Of course, cluster management engine 130 may also determine the number of available nodes 115 in grid 110 or in any one or more of virtual clusters 220. At step 715, cluster management engine 130 selects first job 150 from sorted job queue 525. Next, cluster management engine 130 dynamically determines the optimum shape (or other dimensions) of selected job 150 at 720. Once the optimum shape or dimension of selected job 150 is determined, then cluster management engine 130 determines if it can backfill job 150 in the appropriate virtual cluster 220 in steps 725 through 745.

At decisional step 725, cluster management engine 130 determines if there are enough nodes 115 available for the selected job 150. If there are enough available nodes 115, then at step 730 cluster management engine 130 dynamically allocates nodes 115 for the selected job 150 using any appropriate technique. For example, cluster management engine 130 may use the techniques describes in FIG. 6. Next, at step 735, cluster management engine 130 recalculates the number of available nodes in virtual cluster 220. At step 740, cluster management engine 130 executes job 150 on allocated nodes 115. Once job 150 has been executed (or if there were not enough nodes 115 for selected job 150), then cluster management engine 130 selects the next job 150 in the sorted job queue 525 at step 745 and processing returns to step 720. It will be understood that while illustrated as a loop, cluster management engine 130 may initiate, execute, and terminate the techniques illustrated in method 700 at any appropriate time.

FIG. 8 is a flowchart illustrating an example method 800 for dynamically managing failure of a node 115 in grid 110 in accordance with one embodiment of the present disclosure. At a high level, method 800 describes determining that node 115 failed, automatically performing job recovery and management, and replacing the failed node 115 with a secondary node 115. The following description will focus on the operation of cluster management module 130 in performing this method. But, as with the previous flowcharts, system 100 contemplates using any appropriate combination and arrangement of logical elements implementing some or all of the described functionality.

Method 800 begins at step 805, where cluster management engine 130 determines that node 115 has failed. As described above, cluster management engine 130 may determine that node 115 has failed using any suitable technique. For example, cluster management engine 130 may pull nodes 115 (or agents 132) at various times and may determine that node 115 has failed based upon the lack of a response from node 115. In another example, agent 132 existing on node 115 may communicate a "heartbeat" and the lack of this "heartbeat" may indicate node 115 failure. Next, at step 810, cluster management engine 130 removes the failed node 115 from virtual cluster 220. In one embodiment, cluster management engine 130 may change the status of node 115 in virtual list 522 from "allocated" to "failed". Cluster management engine 130 then determines if a job 150 is associated with failed node 115 at decisional step 815. If there is no job 150 associated with node 115, then processing ends. As described above, before processing ends, cluster management engine 130 may communicate an error message to an administrator, automatically determine a replacement node 115, or any other suitable processing. If there is a job 150 associated with the failed node 115, then the cluster management engine 130 determines other nodes 115 associated with the job 150 at step 820. Next, at step 825, cluster management engine 130 kills job 150 on all appropriate nodes 115. For example, cluster management engine 130 may execute a kill job command or use any other appropriate technique to end job 150. Next, at step 830, cluster management engine 130 de-allocates nodes 115 using virtual list 522. For example, cluster management engine 130 may change the status of nodes 115 in virtual list 522 from "allocated" to "available". Once the job has been terminated and all appropriate nodes 115 de-allocated, then cluster management engine 130 attempts to re-execute the job 150 using available nodes 115 in steps 835 through 850.

At step 835, cluster management engine 130 retrieves policy 524 and parameters for the killed job 150 at step 835. Cluster management engine 130 then determines the optimum subset 230 of nodes 115 in virtual cluster 220, at step 840, based on the retrieved policy 524 and the job parameters. Once the subset 230 of nodes 115 has been determined, then cluster management engine 130 dynamically allocates the subset 230 of nodes 115 at step 845. For example, cluster management engine 130 may change the status of nodes 115 in virtual list 522 from "unallocated" to "allocated". It will be understood that this subset of nodes 115 may be different from the original subset of nodes that job 150 was executing on. For example, cluster management engine 130 may determine that a different subset of nodes is optimal because of the node failure that prompted this execution. In another example, cluster management engine 130 may have determined that a secondary node 115 was operable to replace the failed node 115 and the new subset 230 is substantially similar to the old job space 230. Once the allocated subset 230 has been determined and allocated, then cluster management engine 130 executes job 150 at step 850.

The preceding flowcharts and accompanying description illustrate exemplary methods 600, 700, and 800. In short, system 100 contemplates using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   determining, using one or more computers, an original subset of a plurality of nodes, the original subset comprising nodes currently unallocated to a job, each node in the plurality of nodes comprising a switching fabric comprising a switch integrated on the card and allowing node to node communication during execution of a job;
   selecting a job from a job queue;
   executing the selected job using one or more processors of one or more nodes of the original subset; and
   determining that dimensions of the selected job are greater than a topology of the original subset;
   selecting one or more nodes from a second plurality of nodes, the second plurality being distinct from the original subset, each of the nodes in the second plurality of nodes comprising a switching fabric integrated to a card and at least two processors integrated to the card, wherein the selected one or more nodes from the second plurality are unavailable at the time of selecting; and
   adding the nodes selected from the second plurality to the original subset to satisfy the dimensions of the selected job after the nodes selected from the second plurality become available.

2. The method of claim 1, wherein selecting the job comprises selecting the job from the job queue based on priority, the selected job comprising dimensions not greater than a topology of the original subset.

3. The method of claim 2, wherein selecting the job from the job queue based on priority comprises:
   sorting the job queue based on job priority;
   selecting a first job from the sorted job queue;
   determining dimensions of the first job with the topology of the original subset; and
   in response to the dimensions of the first job being greater than the topology of the original subset, selecting a second job from the sorted job queue.

4. The method of claim 2, wherein the dimensions of the first job are based, at least in part, on one or more job parameters and an associated policy.

5. The method of claim 2, further comprising dynamically allocating a job space from the original subset based, at least in part, on the dimensions of the job, wherein executing the selected job comprises executing the selected job using the job space.

6. The method of claim 1, further comprising executing the selected job using the original subset of nodes including the nodes selected from the second plurality.

7. The method of claim 1, further comprising;
   determining that a second job that was executing on a second subset of the plurality of nodes, the second subset of the plurality of nodes being distinct from the original subset, has failed;
   adding the second subset to the original subset; and
   adding the failed job to the job queue.

8. Software embodied in one or more non-transitory, tangible computer-readable media and when executed operable to:
   determine an original subset of a plurality of nodes, the original subset comprising nodes currently unallocated to a job, each node in the plurality of nodes comprising a switching fabric integrated to a card and at least two processors integrated to the card, the switching fabric comprising a switch integrated on the card and allowing node to node communication during execution of a job;
   select a job from a job queue;
   execute the selected job using one or more processors of one or more nodes of the original subset; and
   determine that dimensions of the selected job are greater than a topology of the original subset;
   select one or more nodes from a second plurality of nodes, the second plurality being distinct from the original subset, each of the second nodes comprising an integrated fabric, wherein the selected one or more nodes from the second plurality are unavailable at the time of selecting; and
   add the selected second nodes to the original subset to satisfy the dimensions of the selected job after the nodes selected from the second plurality become available.

9. The software of claim 8, wherein the software being operable to select the job comprises the software being operable to select the job from the job queue based on priority, the selected job comprising dimensions not greater than a topology of the original subset.

10. The software of claim 9, wherein the software being operable to select the job from the job queue based on priority comprises the software being operable to:
    sort the job queue based on job priority;
    select a first job form the sorted job queue;
    determine dimensions of the first job with the topology of the original subset; and
    in response to the dimensions of the first job being greater than the topology of the original subset, select a second job from the sorted job queue.

11. The software of claim 9, wherein the dimensions of the first job are based, at least in part, on one or more job parameters and an associated policy.

12. The software of claim 9, further dynamically allocate a job space form the original subset based, at least in part, on the dimensions of the job, wherein the software being operable to execute the selected job comprises the software being operable to execute the selected job using the dynamically allocated job space.

13. The software of claim 8, further operable to execute the selected job using the original subset of nodes including the nodes selected from the second plurality.

14. The software of claim 8, further operable to:
   determine that a second job that was executing on a second subset in the plurality of nodes, the second subset of the plurality of nodes being distinct from the original subset, has failed;
   add the second subset to the original subset; and
   add the failed job to the job queue.

15. A system comprising:
   a plurality of nodes, each node comprising a switching fabric integrated to a card and at least two processors integrated to the card, the switching fabric comprising a switch integrated on the card and allowing node to node communication during execution of a job; and
   a management node operable to:
      determine an original subset of the plurality of nodes, the original subset comprising nodes currently unallocated to a job;
      select a job from a job queue;
      execute the selected job using one or more processors of one or more nodes of the original subset; and
      determine that dimensions of the selected job are greater than topology of the original subset;
      select one or more nodes from a second plurality of nodes, the second plurality being distinct from the original subset, each of the nodes in the second plurality of nodes comprising a switching fabric integrated to a card and at least two processors integrated to the card, wherein the selected one or more nodes from the second plurality are unavailable at the time of selecting; and
      add the selected one or more nodes from the second plurality to the original subset to satisfy the dimensions of the selected job after the nodes selected from the second plurality become available.

16. The system of claim 15, wherein the management node being operable to select the job comprises the management node being operable to select the job from the job queue based on priority, the selected job comprising dimensions not greater than a topology of the original subset.

17. The system of claim 16, wherein the management node being operable to select the job form the job queue based on priority comprises the management node being operable to:
   sort the job queue based on job priority;
   select a first job from the sorted job queue;
   determine dimensions of the first job with the topology of the original subset; and
   in response to the dimensions of the first job being greater than the topology of the original subset, select a second job form the sorted job queue.

18. The system of claim 16, wherein the dimensions of the first job are based, at least in part, on one or more job parameters and an associated policy.

19. The system of claim 16, wherein the management node is further operable to dynamically allocate a job space form the original subset based, at least in part, on the dimensions of the job, wherein the management node being operable to execute the selected job comprises the management node being operable to execute the selected job using the dynamically allocated job space.

20. The system of claim 15, wherein the management node is further operable to execute the selected job using the original subset of nodes including the nodes selected from the second plurality.

21. The system of claim 15, wherein the management node is further operable to:
   determine that a second job that was executing on a second subset in the plurality of nodes, the second subset of the plurality of nodes being distinct from the original subset, has failed;
   add the second subset to the original subset; and
   add the failed job to the job queue.

\* \* \* \* \*